(12) United States Patent
Aoki et al.

(10) Patent No.: US 12,039,753 B2
(45) Date of Patent: Jul. 16, 2024

(54) INFORMATION PROCESSING APPARATUS AND INFORMATION PROCESSING METHOD

(71) Applicant: SONY CORPORATION, Tokyo (JP)

(72) Inventors: Hidenori Aoki, Tokyo (JP); Fujio Arai, Tokyo (JP); Keijiroh Nagano, Tokyo (JP); Shintaro Tsutsui, Tokyo (JP); Naoyuki Sato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 529 days.

(21) Appl. No.: 17/250,679

(22) PCT Filed: Aug. 2, 2019

(86) PCT No.: PCT/JP2019/030450
§ 371 (c)(1),
(2) Date: Feb. 18, 2021

(87) PCT Pub. No.: WO2020/044949
PCT Pub. Date: Mar. 5, 2020

(65) Prior Publication Data
US 2021/0312658 A1    Oct. 7, 2021

(30) Foreign Application Priority Data
Aug. 29, 2018    (JP) .................. 2018-160254

(51) Int. Cl.
*G06T 7/73*    (2017.01)
*G01S 5/00*    (2006.01)
(Continued)

(52) U.S. Cl.
CPC .............. *G06T 7/74* (2017.01); *G01S 5/017* (2020.05); *G01S 5/0263* (2013.01); *G02B 27/017* (2013.01); *G06F 3/013* (2013.01)

(58) Field of Classification Search
CPC .... G06T 7/70; G06T 7/73; G06T 7/74; G06T 19/00; G06T 3/00; G01S 5/017;
(Continued)

(56) References Cited

U.S. PATENT DOCUMENTS

2003/0095186 A1    5/2003  Aman et al.
2008/0129581 A1*   6/2008  Douglass ................ G01S 13/34
                                                           342/52

(Continued)

FOREIGN PATENT DOCUMENTS

JP    2012-212346 A    11/2012
WO    2003/044734 A2   5/2003

OTHER PUBLICATIONS

International Search Report and Written Opinion of PCT Application No. PCT/JP2019/030450, issued on Oct. 15, 2019, 12 pages of ISRWO.

*Primary Examiner* — Edward F Urban
*Assistant Examiner* — Duy Tran
(74) *Attorney, Agent, or Firm* — CHIP LAW GROUP

(57) ABSTRACT

An information processing apparatus according to an embodiment of the present technology includes a first acquisition section, a second acquisition section, and a determination section. The first acquisition section acquires a camera-based position indicating a position of a real object, the camera-based position being determined on the basis of a captured image of a real space in which there exists the real object. The second acquisition section acquires an output-wave-based estimation position indicating the position of the real object, the output-wave-based estimation position being determined on the basis of an output wave that is output to the real space from a position that corresponds to the real object. The determination section determines a reference position used to represent virtual content related to the real (Continued)

object, on the basis of the camera-based position and the output-wave-based estimation position.

19 Claims, 12 Drawing Sheets

(51) Int. Cl.
*G01S 5/02* (2010.01)
*G02B 27/01* (2006.01)
*G06F 3/01* (2006.01)

(58) Field of Classification Search
CPC .......... G01S 5/01; G01S 5/014; G01S 5/0295; G01S 5/0263; G01S 5/0264; G01S 5/0244; G01S 5/16; G01S 5/18; G02B 27/017; G02B 27/0138; G02B 27/014; G02B 27/0178; G06F 3/013; G06F 3/011
See application file for complete search history.

(56) References Cited

U.S. PATENT DOCUMENTS

| | | | |
|---|---|---|---|
| 2014/0218361 A1* | 8/2014 | Abe | A63F 13/42 345/424 |
| 2014/0300636 A1* | 10/2014 | Miyazaya | H04R 5/033 345/633 |
| 2015/0309311 A1* | 10/2015 | Cho | G02B 27/017 345/8 |
| 2016/0358343 A1* | 12/2016 | Kasahara | G06F 3/017 |
| 2017/0187991 A1 | 6/2017 | Toros et al. | |
| 2018/0067204 A1* | 3/2018 | Frizzell | G01S 13/887 |

\* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/030450 filed on Aug. 2, 2019, which claims priority benefit of Japanese Patent Application No. JP 2018-160254 filed in the Japan Patent Office on Aug. 29, 2018. Each of the above-referenced applications is hereby incorporated herein by reference in its entirety.

TECHNICAL FIELD

The present technology relates to an information processing apparatus, an information processing method, and a program that are applicable to augmented reality (AR) display.

BACKGROUND ART

In the image display apparatus disclosed in Patent Literature 1, it is possible to switch between a normal display mode and a facing display mode. In the normal display mode, an input image is displayed on a screen without any change. In the facing display mode, a facing image is displayed on a screen, the facing image being an image processed such that a reference surface (such as a front surface) of an object recognized on the basis of the input image faces an image-capturing surface. It is possible to improve the ease of use of a virtual object (such as an annotation of an AR application) related to the recognized object by the virtual object being superimposed on the facing image.

CITATION LIST

Patent Literature

Patent Literature 1: Japanese Patent Application Laid-open No. 2012-212346

DISCLOSURE OF INVENTION

Technical Problem

The virtual experience using an AR technology is expected to be applied to various scenes such as amusement, education, and a production site, and there is a need for a technology that makes it possible to provide a high-quality virtual experience.

In view of the circumstances described above, it is an object of the present technology to provide an information processing apparatus, an information processing method, and a program that are capable of providing a high-quality virtual experience.

Solution to Problem

In order to achieve the object described above, an information processing apparatus according to an embodiment of the present technology includes a first acquisition section, a second acquisition section, and a determination section.

The first acquisition section acquires a camera-based position indicating a position of a real object, the camera-based position being determined on the basis of a captured image of a real space in which there exists the real object.

The second acquisition section acquires an output-wave-based estimation position indicating the position of the real object, the output-wave-based estimation position being determined on the basis of an output wave that is output to the real space from a position that corresponds to the real object.

The determination section determines a reference position used to represent virtual content related to the real object, on the basis of the camera-based position and the output-wave-based estimation position.

In this information processing apparatus, a reference position used to represent virtual content related to a real object is determined on the basis of a camera-based position of a real object and an output-wave-based estimation position of the real object, the camera-based position being determined on the basis of a captured image, the output-wave-based estimation position being determined on the basis of an output wave that is output to a real space. This makes it possible to provide a high-quality virtual experience.

The determination section may determine a final estimation position of the real object as the reference position.

The output wave may include at least one of a radio wave or a sound wave.

The first acquisition section may acquire first reliability related to the camera-based position. In this case, the second acquisition section may acquire second reliability related to the output-wave-based estimation position. Further, the determination section may determine the reference position on the basis of the first reliability and the second reliability.

When the first reliability exhibits a value greater than a specified threshold, the determination section may determine the camera-based position as the reference position.

The information processing apparatus may further include a representation control section that controls the representation of the virtual content on the basis of the reference position.

The representation control section may control display of a virtual object related to the real object.

The representation control section may control a display position of the virtual object.

In response to a movement of a user or a movement of a line of sight of the user being detected, the representation control section may change the display position of the virtual object while the user is moving or while the line of sight of the user is being moved.

The representation control section may control output of sound from a virtual sound source related to the real object.

The representation control section may control a position of the virtual sound source.

The information processing apparatus may further include a first estimator and a second estimator.

The first estimator estimates the camera-based position on the basis of the captured image; and The second estimator estimates the output-wave-based estimation position on the basis of the output wave.

The first estimator may calculate the first reliability on the basis of a result of matching processing on the captured image to check against a model image of the real object.

The second estimator may calculate a distance to the real object on the basis of the output wave; may calculate a candidate range in which there possibly exists the real object, on the basis of the calculated distance; and may estimate a position within the calculated candidate range as the output-wave-based estimation position.

The second estimator may calculate the second reliability on the basis of a size of the calculated candidate range.

The second estimator may receive information regarding a distance from another apparatus to the real object, the distance being calculated by the other apparatus on the basis of the output wave; and may calculate the candidate range on the basis of the received information regarding the distance from the other apparatus to the real object.

The information processing apparatus may be configured as a head-mounted display (HMD).

The information processing apparatus may further include a model image generator that generates the model image on the basis of the captured image.

An information processing method according to an embodiment of the present technology is an information processing method that is performed by a computer system, the information processing method including acquiring a camera-based position indicating a position of a real object, the camera-based position being determined on the basis of a captured image of a real space in which there exists the real object.

An output-wave-based estimation position is acquired that indicates the position of the real object, the output-wave-based estimation position being determined on the basis of an output wave that is output to the real space from a position that corresponds to the real object.

A reference position used to represent virtual content related to the real object is determined on the basis of the camera-based position and the output-wave-based estimation position.

A computer system according to an embodiment of the present technology causes a computer system to perform a process including:
  acquiring a camera-based position indicating a position of a real object, the camera-based position being determined on the basis of a captured image of a real space in which there exists the real object;
  acquiring an output-wave-based estimation position indicating the position of the real object, the output-wave-based estimation position being determined on the basis of an output wave that is output to the real space from a position that corresponds to the real object; and
  determining a reference position used to represent virtual content related to the real object, on the basis of the camera-based position and the output-wave-based estimation position.

Advantageous Effects of Invention

As described above, the present technology makes it possible to provide a high-quality virtual experience. Note that the effect described here is not necessarily limitative, and any of the effects described in the present disclosure may be provided.

MODE(S) FOR CARRYING OUT THE INVENTION

Embodiments according to the present technology will now be described below with reference to the drawings.

[AR Providing System]

Figure 1:
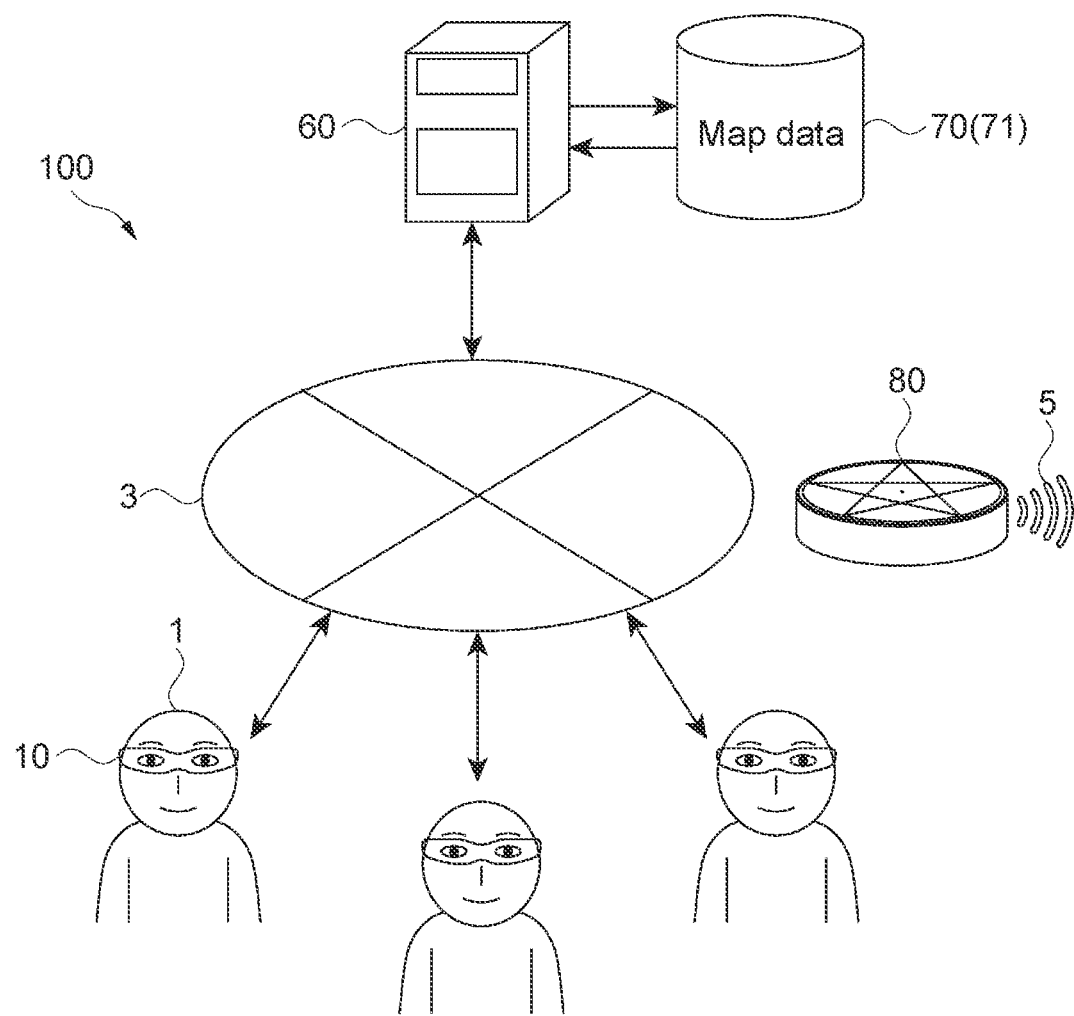
FIG. 1 schematically illustrates an example of a configuration of an AR providing system according to an embodiment.

FIG. 1 schematically illustrates an example of a configuration of an AR providing system according to an embodiment of the present technology. An AR providing system 100 corresponds to an embodiment of an information processing system according to the present technology.

The AR providing system 100 includes a head-mounted display (HMD) 10, a server apparatus 60, and a real object 80.

The HMD 10 is used by being attached to the head of a user 1. The number of HMDs 10 included in the AR providing system 100 is not limited, although three HMDs 10 are illustrated in FIG. 1. In other words, the number of users 1 allowed to simultaneously participate in the AR providing system 100 is not limited. The HMD 10 serves as an embodiment of the information processing apparatus according to the present technology.

The server apparatus 60 is communicatively connected to the respective HMDs 10 through a network 3. The server apparatus 60 is capable of receiving various information from the respective HMDs 10 through the network 3. Further, the server apparatus 60 is capable of storing various information in a database 70, and is capable of reading various information stored in the database 70 to transmit the read information to the respective HMDs 10.

In the present embodiment, the database 70 stores therein map data 71. The map data 71 is data that serves as a map related to a real space. In the present embodiment, the map data 71 related to a specified real space and used to provide an AR experience to the user 1 is stored.

The network 3 is built using, for example, the Internet or a wide area communication network. Moreover, any wide area network (WAN), any local area network (LAN), or the like may be used, and the protocol used to build the network 3 is not limited.

In the present embodiment, so-called cloud services are provided by the network 3, the server apparatus 60, and the database 70. Thus, the HMD 10 is also considered to be connected to a cloud network.

The real object 80 is an object that actually exists in a real space. In the present embodiment, virtual content related to the real object 80 is represented on the basis of the real object 80. Examples of the representation of the virtual content include display of a virtual object related to the real object 80, and output of sound from a virtual sound source related to the real object 80. Of course, the representation is not limited to these examples.

In the present embodiment, a beacon signal 5 that conforms to the Bluetooth low energy (BLE) standard is output to a real space from the real object 80. The interval at which the beacon signal 5 is output is not limited, and may be set discretionarily.

In the present embodiment, the real object 80 corresponds to a real object. Further, the beacon signal 5 output from the real object 80 corresponds to a radio wave that is an output wave that is output to a real space from a position corresponding to the real object.

[Head-Mounted Display (HMD)]

Figure 2:
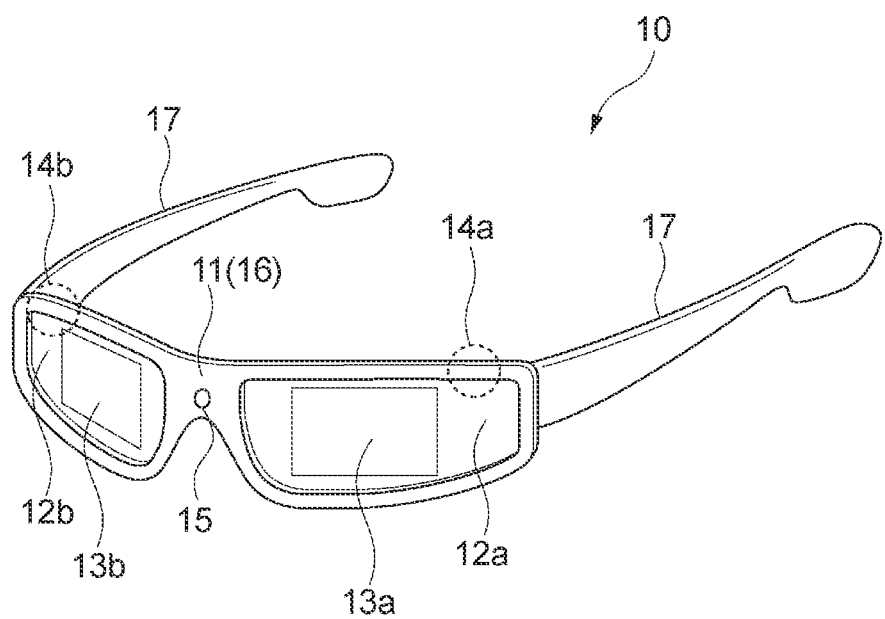
FIG. 2 is a perspective view illustrating an example of an appearance of an HMD.

FIG. 2 is a perspective view illustrating an example of an appearance of the HMD 10. The HMD 10 is an eyeglass-style apparatus including a transmissive display, and is also referred to as AR glasses. The HMD 10 includes a frame 11, a left-eye lens 12*a* and a right-eye lens 12*b*, a left-eye display 13*a* and a right-eye display 13*b*, a left-eye camera 14*a* and a right-eye camera 14*b*, and an outward-oriented camera 15.

The frame 11 has a shape of glasses, and includes a rim portion 16 and temple portions 17. The rim portion 16 is a portion arranged in front of the left and right eyes of the user 1, and supports the left eye lens 12*a* and the right eye lens 12*b*. The temple portions 17 respectively extend rearward from the ends of the rim portion 16 to the ears of the user 1, and are respectively worn on the ears with the tips of the temple portions 17. The rim portion 16 and the temple portion 17 are formed of, for example, material such as a synthetic resin or metal.

The left-eye lens 12*a* and the right-eye lens 12*b* are respectively arranged in front of the left and right eyes of the user 1 to cover at least a portion of the field of view of the user 1. Typically, each lens is designed to correct the vision of the user 1. Of course, the present technology is not limited to this, and a so-called plain-glass lens may be used.

The left-eye display 13*a* and the right-eye display 13*b* are transmissive displays, and are respectively arranged to cover regions that are portions of the left-eye lens 12*a* and the right-eye lens 12*b*. In other words, the left-eye lens 12*a* and right-eye lens 12*b* are respectively arranged in front of the left eye and the right eye of the user 1.

Images or the like for the left eye and the right eye are respectively displayed on the left-eye display 13*a* and the right-eye display 13*b*. The user 1 who is wearing the HMD 10 can visually confirm the actual scenery and visually confirm images displayed on the respective displays 13*a* and 13*b* at the same time. This results in providing, for example, an augmented reality (AR) experience to the user 1.

For example, a virtual display object (virtual object) is displayed on the respective displays 13*a* and 13*b*. For example, computer graphics (CG), a photograph, a letter, and the like of a character can be displayed as a virtual object. Of course, the virtual object is not limited to this, and any virtual object may be displayed. In the present embodiment, the virtual object corresponds to a virtual object.

For example, a transmissive organic EL display, a transmissive liquid crystal display (LCD), or the like is used as the left-eye display 13*a* and the right-eye display 13*b*. Moreover, a specific configuration of the left-eye display 13*a* and the right-eye display 13*b* is not limited. For example, a transmissive display using any approach such as an approach of projecting and displaying an image on a transparent screen, or an approach of displaying an image using, for example, a prism may be used as appropriate.

The left-eye camera 14*a* and the right-eye camera 14*b* are provided to the frame 11 as appropriate such that it is possible to capture images of the left eye and the right eye of the user 1. For example, it is possible to detect, for example, line-of-sight information regarding a line of sight of the user 1 on the basis of images of the left eye and the right eye that are respectively captured by the left-eye camera 14*a* and the right-eye camera 14*b*.

A digital camera that includes, for example, an image sensor such as a complementary metal-oxide semiconductor (CMOS) sensor or a charge coupled device (CCD) sensor is used as the left-eye camera 15*a* and the right-eye camera 15*b*. Further, for example, an infrared camera that includes an infrared illumination such as an infrared LED may be used.

Hereinafter, the left-eye lens 12*a* and the right-eye lens 12*b* may be referred to as a lens 12, and the left-eye display 13*a* and the right-eye display 13*b* may be referred to as a transmissive display 13. Further, the left-eye camera 14*a* and the right-eye camera 14*b* may be referred to as an inward-oriented camera 14. In the present embodiment, the transmissive display 13 corresponds to a display section.

The outward-oriented camera 15 is arranged in a center portion of the frame 11 (the rim portion 16) to be oriented outward (toward the side opposite to the user 1). The outward-oriented camera 15 is capable of capturing an image of a real space within the field of view of the user 1. Thus, the outward-oriented camera 15 is capable of generating a captured image in which a real space appears.

In the present embodiment, an image of a range that is situated on the front side and includes a display region of the transmissive display 13, as viewed from the user 1, is captured by the outward-oriented camera 15. In other words, an image of a real space is captured such that a range that is visible through the display region is included, as viewed from the user 1. A digital camera that includes, for example, an image sensor such as a CMOS sensor or a CCD sensor is used as the outward-oriented camera 15.

Figure 3:
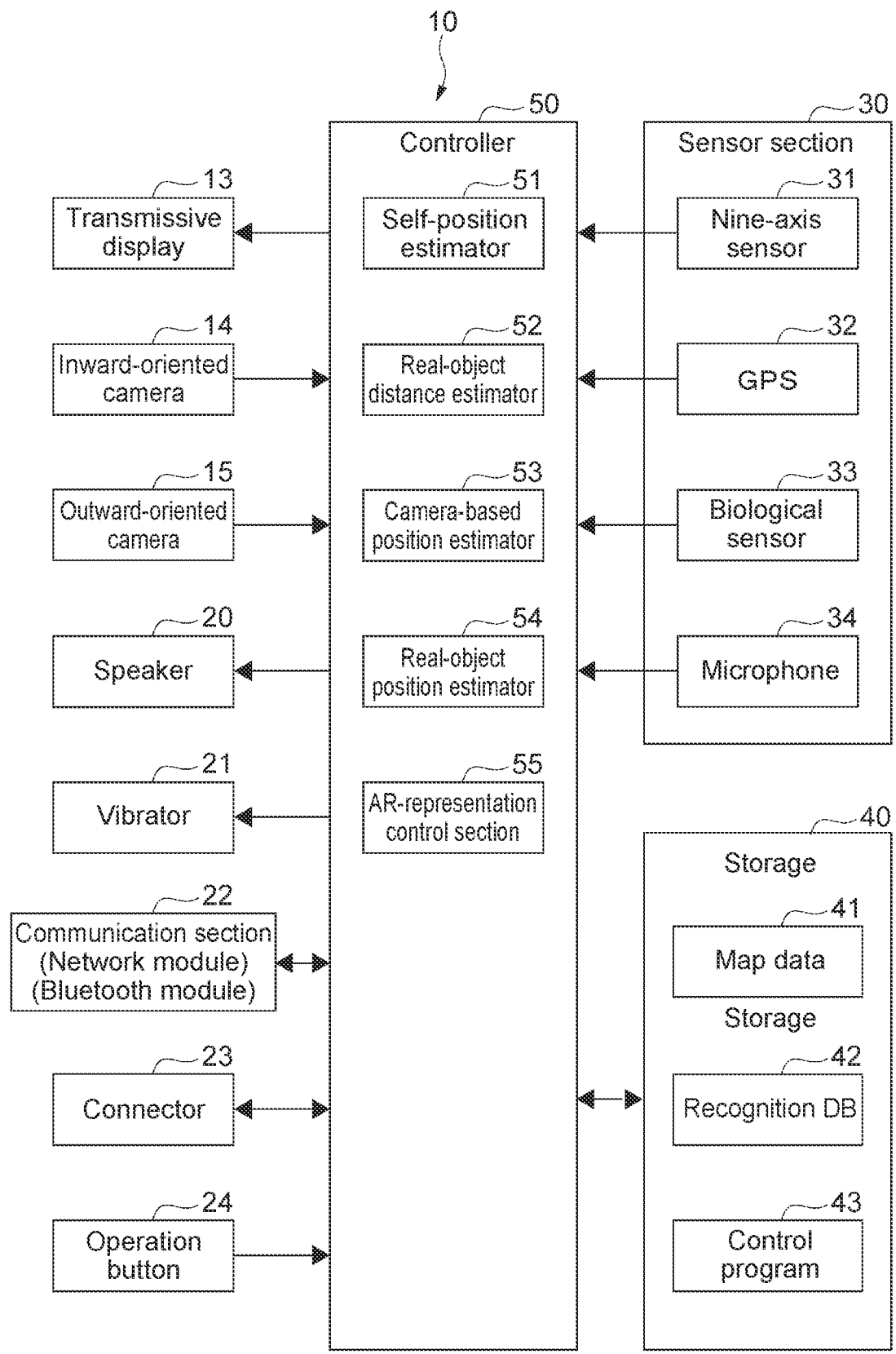
FIG. 3 is a block diagram illustrating an example of a functional configuration of the HMD.

FIG. 3 is a block diagram illustrating an example of a functional configuration of the HMD 10. As illustrated in FIG. 3, the HMD 10 further includes a speaker 20, a vibrator 21, a communication section 22, a connector 23, an operation button 24, a sensor section 30, a storage 40, and a controller 50.

The speaker 20 is provided at a specified position in the frame 11. The configuration of the speaker 20 is not limited, and, for example, the speaker 20 being capable of outputting a stereophonic sound, a monophonic sound, and the like may be used as appropriate.

The vibrator 21 is provided within the frame 11 and generates vibration. For example, any vibration motor or the like being capable of generating, for example, a vibration for notification is used as the vibrator 21.

The communication section 22 is a module used to perform network communication, near-field communication, or the like with another device. In the present embodiment, a network module and a Bluetooth module are provided as the communication section 22.

The network module is an interface used to establish a connection with the network 3, and, for example, a wireless LAN module such as Wi-Fi is used. When the network module is operated, this makes it possible to perform wireless communication with the server apparatus 60.

The Bluetooth module is a module used to perform near-field communication conforming to the Bluetooth standards. In the present embodiment, it is possible to perform communication conforming to the BLE standard (BLE communication).

The Bluetooth module is capable of receiving a beacon signal that conforms to the BLE standard. Information included in the received beacon signal is output to the controller 50, and various processes are performed. For example, on the basis of the intensity of a beacon signal (radio wave intensity), it is possible to calculate a distance to an apparatus that outputs the beacon signal.

The connector 23 is a terminal used to establish a connection with another device. For example, a terminal such as a universal serial bus (USB) and a high-definition multimedia interface (HDMI) (registered trademark) is provided. Further, upon charging, a charging terminal of a charging dock (cradle) and the connector 23 are connected to perform charging.

The operation button 24 is provided at, for example, a specified position in the frame 11. The operation button 24 makes it possible to perform an ON/OFF operation of a power supply, and an operation related to various functions of the HMD 10, such as a function related to display of an image and output of sound, and a function of a network communication.

The sensor section 30 includes a nine-axis sensor 31, a GPS 32, a biological sensor 33, and a microphone 34.

The nine-axis sensor 31 includes a three-axis acceleration sensor, a three-axis gyroscope, and a three-axis compass sensor. The nine-axis sensor 31 makes it possible to detect acceleration, angular velocity, and azimuth of the HMD 10 in three axes. The GPS 32 acquires information regarding the current position of the HMD 10. Results of detection performed by the nine-axis sensor 31 and the GPS 32 are used to detect, for example, the pose and the position of the user 1 (the HMD 10), and the movement (motion) of the user 1. These sensors are provided at, for example, specified positions in the frame 11.

The biological sensor 33 is capable of detecting biological information regarding the user 1. For example, a brain wave sensor, a myoelectric sensor, a pulse sensor, a perspiration sensor, a temperature sensor, a blood flow sensor, a body motion sensor, and the like are provided as the biological sensor 33.

The microphone 34 detects information regarding sound around the user 1. For example, a voice from speech of the user is detected as appropriate. This enables the user 1 to, for example, enjoy AR experience while making a voice call and perform input of an operation of the HMD 10 using voice input.

The type of sensor provided as the sensor section 30 is not limited, and any sensor may be provided. For example, a temperature sensor, a humidity sensor, or the like that is capable of measuring a temperature, humidity, or the like of the environment in which the HMD 10 is used may be provided. The inward-oriented camera 14 and the outward-oriented camera 15 can also be considered a portion of the sensor section 30.

The storage 40 is a storage device such as a nonvolatile memory, and, for example, a hard disk drive (HDD), a solid state drive (SSD), or the like is used. Moreover, any non-transitory computer readable storage medium may be used.

Map data 41 is stored in the storage 40. The map data 41 is data that serves as a map related to a real space. In the present embodiment, the map data 41 related to a specified real space and used to provide an AR experience to the user 1 is stored. The map data 41 is the same information as the map data 71 stored in the database 70 of the server apparatus 60 illustrated in FIG. 1.

Further, a recognition DB 42 is created in the storage 40. Various model images used to perform image recognition on a captured image captured by the outward-oriented camera 15 are stored in the recognition DB 42. In the present embodiment, a model image is stored that is used to detect the real object 80 from a captured image. Typically, at least one image of the real object 80 illustrated in FIG. 1 is stored as the model image. Of course, CG or the like of the real object 80 may be stored as the model image.

Furthermore, the storage 40 stores therein a control program 43 used to control an operation of the overall HMD 10. The method for installing the map data 41, the recognition DB (model image), and the control program 43 on the HMD 10 is not limited.

The controller 50 controls operations of the respective blocks of the HMD 10. The controller 50 includes a circuit of hardware, such as a CPU and a memory (a RAM and a ROM), that is necessary for a computer. Various processes are performed by the CPU loading, into the RAM, the control program 43 stored in the storage 40 and executing the control program 43.

For example, a programmable logic device (PLD) such as a field programmable gate array (FPGA), or other devices such as an application specific integrated circuit (ASIC) may be used as the controller 50.

In the present embodiment, a self-position estimator 51, a real-object distance estimator 52, a camera-based position estimator 53, a real-object position estimator 54, and an AR-representation control section 55 are implemented as functional blocks by the CPU of the controller 50 executing a program (such as an application program) according to the present embodiment. Then, the information processing method according to the present embodiment is performed by these functional blocks. Note that, in order to implement each functional block, dedicated hardware such as an integrated circuit (IC) may be used as appropriate.

The self-position estimator 51 estimates a self-position of the HMD 10. In the present disclosure, the self-position includes the position and the pose of the HMD 10. In other words, the self-position estimator 51 is capable of calculating position information regarding a position of the HMD 10 in the map data 41 and pose information regarding, for example, an orientation of the HMD 10.

The self-position of the HMD 10 is calculated on the basis of a result of detection performed by the sensor section 30 and captured images captured by the inward-oriented camera 14 and the outward-oriented camera 15. For example, position coordinates in a three-dimensional coordinate system (an XYZ coordinate system) of which the origin is a specified position, are calculated. Further, a pitch angle, a roll angle, and a yaw angle of a specified reference axis extending on the front side of the user 1 (the HMD 10) are calculated, where the X-axis is a pitch axis, the Y-axis is a roll axis, and the Z-axis is a yaw axis. Of course, a specific format and the like of the position information and the pose information regarding the user 1 (the HMD 10) are not limited.

The algorithm used to estimate a self-position of the HMD 10 is not limited, and any algorithm such as simultaneous localization and mapping (SLAM) may be used. Any machine-learning algorithm using, for example, a deep neural network (DNN) may be used to estimate the self-position. For example, it is possible to improve the accuracy in estimating a self-position by using, for example, artificial intelligence (AI) that performs deep learning.

The real-object distance estimator 52 calculates a distance to the real object 80 on the basis of the beacon signal 5 output from the real object 80. The real-object distance estimator 52 calculates a distance from the HMD 10 to the real object 80 on the basis of the radio wave intensity of the beacon signal 5 received by the Bluetooth module illustrated in FIG. 2.

The camera-based position estimator 53 estimates a position of the real object 80 in the map data 41 on the basis of a captured image captured by the outward-oriented camera 15. The position of the real object 80 that is estimated by the camera-based position estimator 53 may be hereinafter referred to as a camera-based position. Further, the camera-based position estimator 53 calculates the reliability of the estimated camera-based position.

In the present embodiment, the camera-based position of the real object 80 corresponds to a camera-based position that indicates a position of a real object, the position of the real object being determined on the basis of a captured image of a real space in which there exists the real object. Further, the reliability of the camera-based position corresponds to first reliability related to the camera-based position. Furthermore, the camera-based position estimator 53 corresponds to a first estimator that estimates the camera-based position on the basis of the captured image.

The real-object position estimator 54 receives to acquire the camera-based position and the reliability that are calculated by the camera-based position estimator 53. Further, the real-object position estimator 54 receives to acquire a radio-wave-based position and the reliability, the radio-wave-based position and the reliability being calculated by the server apparatus 60. Note that the radio-wave-based position and the reliability will be described later.

The real-object position estimator 54 calculates a reference position used for representation of virtual content related to the real object 80, on the basis of the acquired camera-based position and reliability, and on the basis of the acquired radio-wave-based position and reliability. In the present embodiment, a final estimation position that is a final estimation position of the real object 80 is calculated by the real-object position estimator 54. Then, the final estimation position of the real object 80 is calculated as the reference position.

In the present embodiment, the real-object position estimator 54 serves as a first acquisition section, a second acquisition section, and a determination section. In the present disclosure, "determining" includes obtaining a target using any method such as "referring to a table" and "selecting (what is more reliable)" in addition to directly "calculating". In the present embodiment, "determining", for example, a camera-based position, a radio-wave-based position, and a final estimation position is described using a wording "calculating". Of course, this is merely an embodiment, and the "determining" the respective positions is not limited to a concept included in the wording "calculating".

Note that, in the present disclosure, acquiring data or the like includes any form in which data or the like can be processed, such as measuring data using a sensor or the like, receiving data by communication or the like, and reading data stored in a recording medium or the like.

The AR-representation control section 55 controls representation of virtual content related to the real object 80. For example, display of a virtual object 7 related to the real object 80 and output of sound from a virtual sound source related to the real object 80 are controlled by the AR-representation control section 55. Note that the representation of virtual content is controlled, with the reference position calculated by the real-object position estimator 54 being used as a reference. Thus, the reference position used for representation of virtual content refers to a position used as a reference when the virtual content is represented.

[Server Apparatus]

The server apparatus 60 includes hardware, such as a CPU, a ROM, a RAM, and an HDD, that is necessary for a configuration of a computer. A radio-wave-based position estimator 61 and a reliability determination section 62 (refer to FIG. 6) are implemented as functional blocks by the CPU loading, into the RAM, a program according to the present technology that has been recorded in the ROM or the like and executing the program, and this results in the information processing method according to the present technology being performed.

The server apparatus 60 can be implemented by any computer such as a personal computer (PC). Of course, hardware such as an FPGA or an ASIC may be used. In order to implement each block illustrated in FIG. 6, dedicated hardware such as an integrated circuit (IC) may be used.

The program is installed on the server apparatus 60 through, for example, various recording media. Alternatively, the installation of the program may be performed via, for example, the Internet.

Further, the server apparatus 60 includes a communication section (of which an illustration is omitted) used to perform network communication, near-field communication, or the like with another device. When the communication section is operated, this makes it possible to perform wireless communication with the HMD 10.

The radio-wave-based position estimator 61 estimates a position of the real object 80 in the map data 71 on the basis of a distance to the real object 80 that is transmitted by the real-object distance estimator 52 of the HMD 10. The position of the real object 80 that is estimated by the radio-wave-based position estimator 61 corresponds to the radio-wave-based position described above. The reliability determination section 62 calculates the reliability of the estimated radio-wave-based position.

In the present embodiment, the radio-wave-based position of the real object 80 corresponds to an output-wave-based estimation position that indicates a position of a real object that is determined on the basis of an output wave that is output to a real space from a position that corresponds to the real object. Further, the reliability of the radio-wave-based position corresponds to second reliability related to the output-wave-based estimation position. In the present embodiment, a second estimator that estimates an output-wave-based estimation position on the basis of an output wave is implemented by the real-object distance estimator 52 and the radio-wave-based position estimator 61. Note that the radio-wave-based position can also referred to as a non-camera estimation position.

[Real Object]

The real object 80 includes a BLE beacon output section 81 (refer to FIG. 6), and the beacon signal 5 is regularly output. The BLE beacon output section 81 may be built in the real object 80. Alternatively, for example, a beacon apparatus that is capable of outputting the beacon signal 5 may be mounted on the real object 80. In this case, the beacon apparatus serves as the BLE beacon output section 81.

Figure 4:
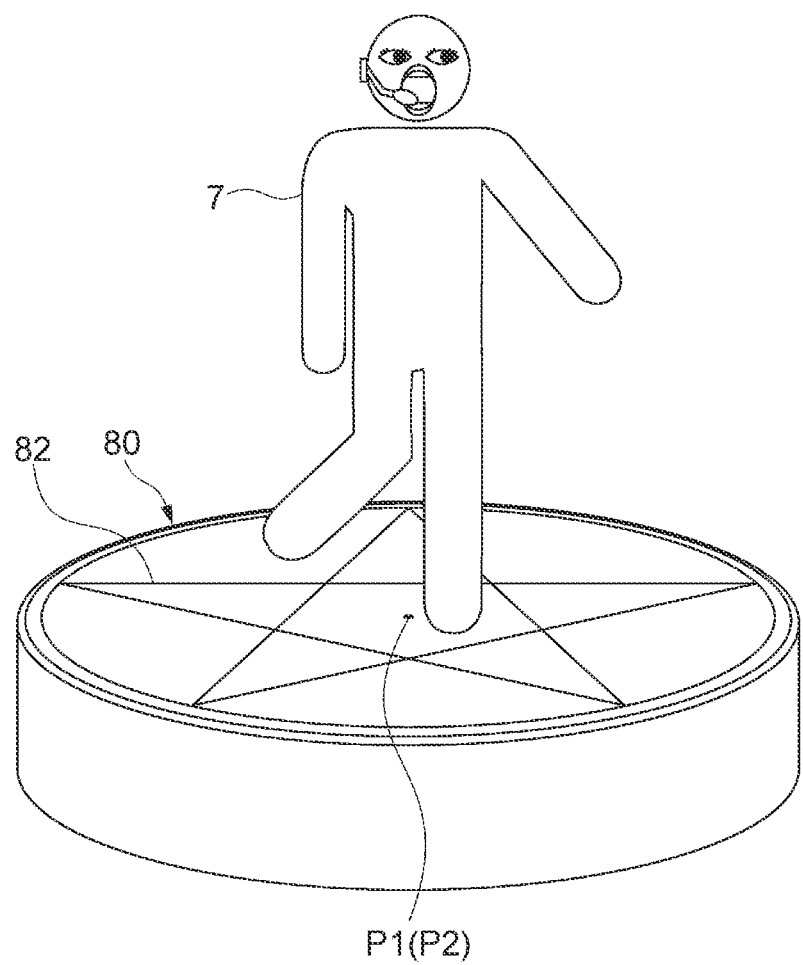
FIG. 4 is a diagram for describing an example of AR representation of virtual content related to a real object.

FIG. 4 is a diagram for describing an example of AR representation of virtual content related to the real object 80. The real object 80 according to the present embodiment has a cylindrical shape, and a star-shaped mark 82 is depicted on an upper surface of the real object 80.

In the present embodiment, virtual content is represented, with a position P1 of the center of the star-shaped mark 82 being used as a reference. Specifically, as illustrated in FIG. 4, a character who is standing in the center of the star-shaped mark 82 of the real object 80 used as a stage and is singing while dancing, is represented as virtual content.

The real-object position estimator 54 of the HMD 10 estimates the position P1 of the center of the star-shaped mark 82 as a final estimation position of the real object 80. The estimated center position P1 is set to be a final estimation position P2. Then, the AR-representation control section 55 controls display of the virtual object 7 (the singing character) on the transmissive display 13 using the final estimation position P2 as a reference position used for representation of virtual content.

Note that FIG. 4 illustrates an example in which the position P1 of an actual center and the final estimation position P2 are the same position.

For example, the AR-representation control section 55 controls a display position of the virtual object 7 on the basis of the final estimation position P2. Specifically, the display position of the virtual object 7 is controlled such that the virtual object 7 is situated at the final estimation position P2. Of course, the virtual object 7 is not displayed on the transmissive display 13 when, for example, the user 1 is not at all looking at the real object 80.

The AR-representation control section 55 controls output of sound such that a song that the virtual object 7 is singing is heard from the final estimation position P2. In other words, output of sound from a virtual sound source situated at the final estimation position P2 is controlled. For example, when the user 1 is looking at the real object 80 from the front, output of sound is controlled such that a song is heard from a virtual sound source situated in front of the user 1.

When the user 1 is looking in a direction different from a direction in which the real object 80 is situated, output of sound is controlled such that a song is heard from where the real object 80 is situated. In other words, the AR-representation control section 55 is capable of controlling a position (a fixed position) of a virtual sound source. Note that the control of the speaker 20 makes it possible to control a position of a virtual sound source, that is, a direction from which sound is heard.

As described above, in the present embodiment, it is possible to enjoy an auditory AR experience as well as a visual AR experience. The sound output from a virtual sound source can also be referred to as virtual sound. Alternatively, the sound output from a virtual sound source can also be referred to as sound heard from a virtual direction. Compared with the accuracy in a display position of the virtual object 7, the degree of accuracy in a position of a virtual sound source (the degree of accuracy in a direction from which sound is heard) may be low. Note that, in the present embodiment, the virtual object 7 can also be considered a virtual sound source.

[Example of AR Experience]

Figure 5:
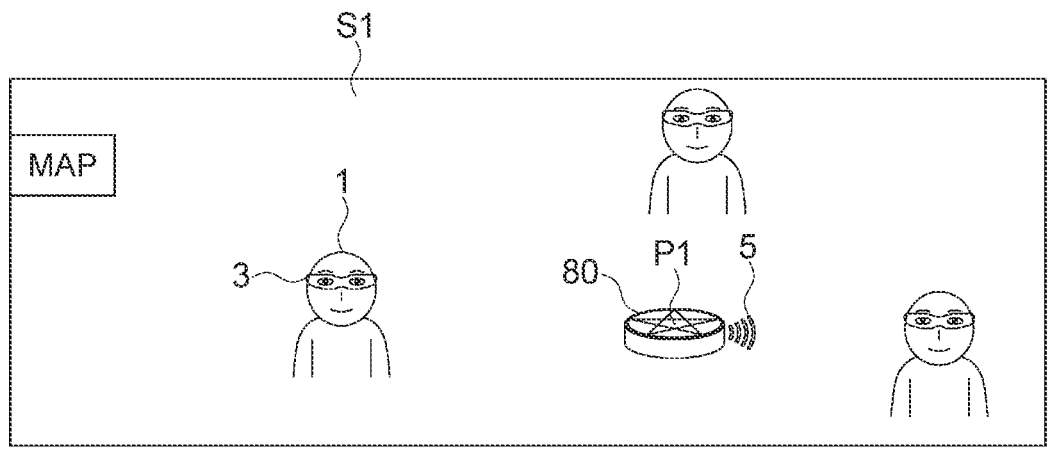
FIG. 5 is a schematic diagram for describing an example of an AR experience that can be provided by the AR providing system.

FIG. 5 is a schematic diagram for describing an example of an AR experience that can be provided by the AR providing system 100. The real object 80 is arranged at a specified position in a specified space S1. The position P1 of the center of the star-shaped mark 82 of the real object 80 is an actual position of the real object 80.

The user 1 moves around the space S1 in a state of wearing the HMD 10, and looks for the real object 80 and the virtual object 7. Note that the storage 40 of the HMD 10 and the database 70 of the server apparatus 60 respectively store therein the map data 41 of the space S1 and the map data 71 of the space S1. Further, the beacon signal 5 output from the real object 80 can be output regardless of the place in the space S1. Of course, the present technology is not limited to such an AR experience, and is applicable to the case of providing any AR experience.

Figure 6:
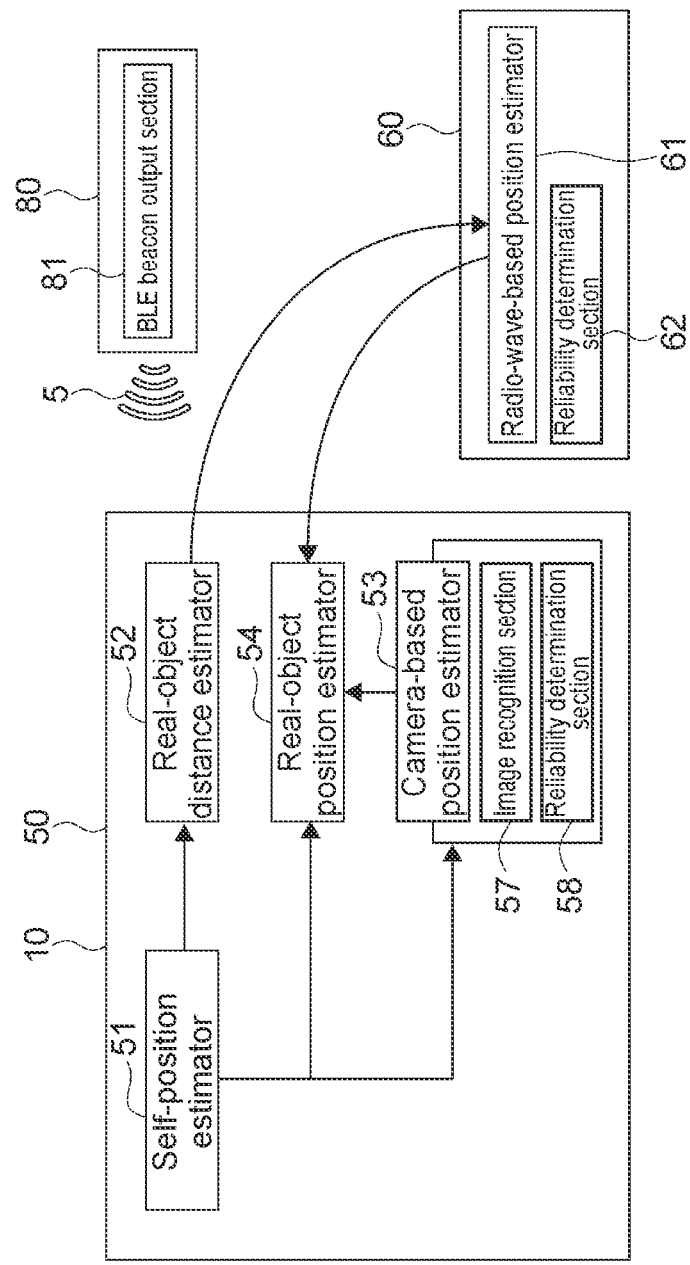
FIG. 6 is a schematic diagram for describing an operation of each functional block constructed in the AR providing system.

FIG. 6 is a schematic diagram for describing an operation of each functional block constructed in the AR providing system 100. For example, processing of calculating the final estimation position P2 of the real object 80 described below is repeated at a specified interval. For example, the final estimation position P2 may be calculated and updated every time a frame image is captured in accordance with the frame rate of a captured image captured by the outward-oriented camera 15. Of course, the present technology is not limited to this.

A self-position (position information and pose information) is estimated by the self-position estimator 51. The estimated self-position is output to the real-object distance estimator 52, the real-object position estimator 54, and the camera-based position estimator 53.

The real-object distance estimator 52 calculates a distance from the HMD 10 to the real object 80 on the basis of the beacon signal 5. The real-object distance estimator 52 transmits, to the server apparatus 60 and through the communication section 22, the self-position of the HMD 10 that is acquired from the self-position estimator 51, and the distance from the HMD 10 to the real object 80.

The radio-wave-based position estimator 61 of the server apparatus 60 calculates a radio-wave-based position of the real object 80 on the basis of the self-position of the HMD 10 and the distance from the HMD 10 to the real object 80. The reliability determination section 62 calculates the reliability of the estimated radio-wave-based position. The radio-wave-based position calculated by the radio-wave-based position estimator 61 and the reliability calculated by the reliability determination section 62 are transmitted to the real-object position estimator 54 of the HMD 10.

Figure 7A:
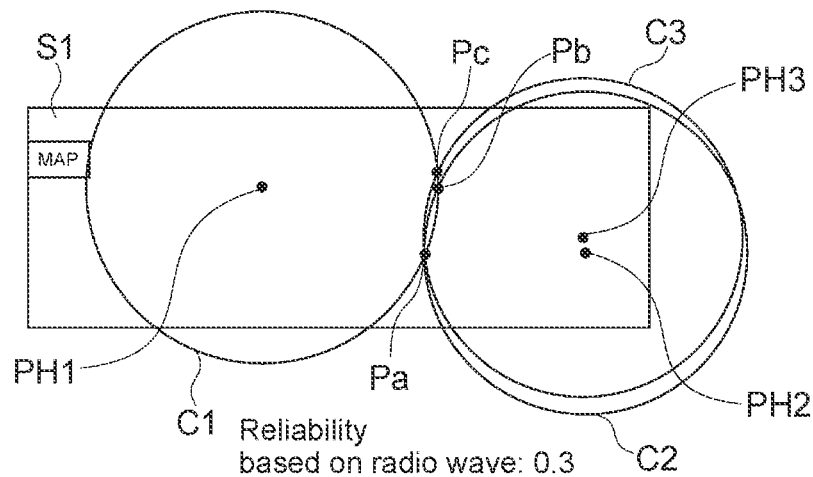
FIGS. 7A, 7B, and 7C are schematic diagrams for describing an example of calculating a radio-wave-based position and the reliability.
Figure 7B:
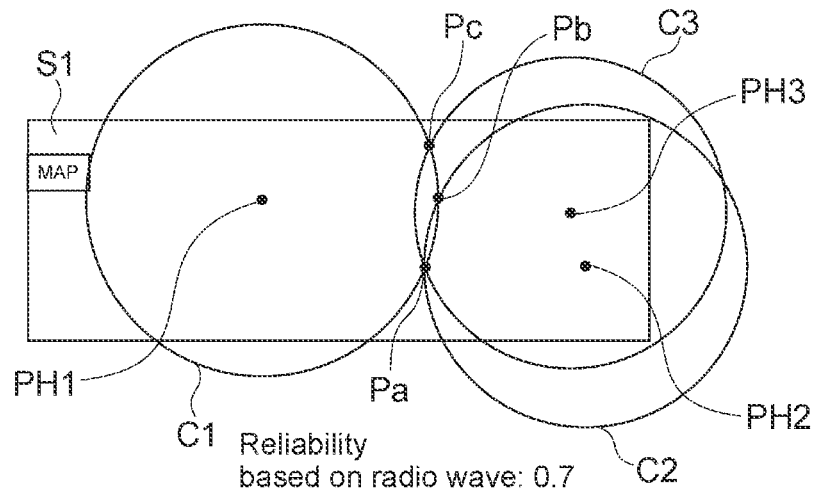
Figure 7C:
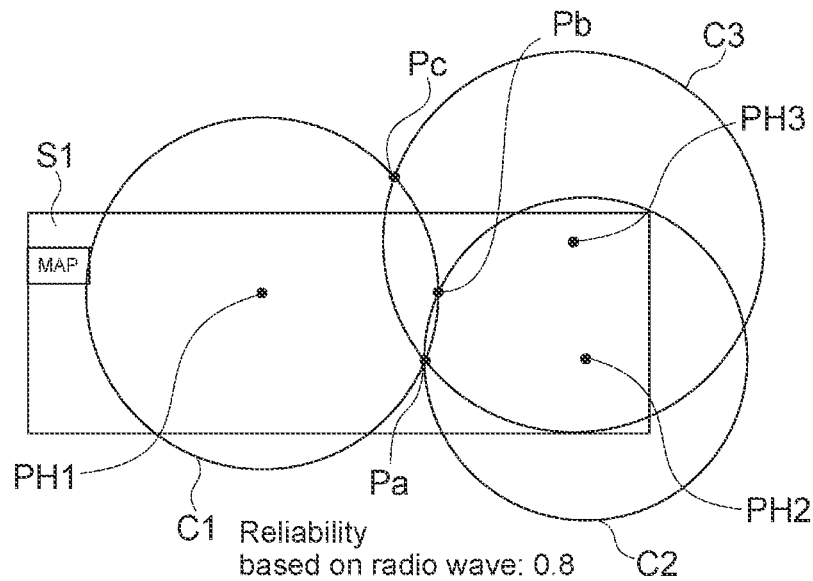

FIGS. 7A, 7B, and 7C are schematic diagrams for describing an example of calculating a radio-wave-based position and the reliability.

In FIGS. 7A, 7B, and 7C, positions of the HMD 10 are schematically illustrated in a state of being respectively denoted by symbols PH1, PH2, . . . . Further, circles that are drawn centered at the respective positions of the HMD 10 on the basis of the distance from the HMD 10 to the real object 80, are illustrated in a state of being respectively denoted by symbols C1, C2, . . . . The position of the HMD 10 and the circle are associated with each other on the basis of the number, such that a circle centered at the position PH1 of the HMD 10 is the circle C1.

On the basis of a self-position and a distance to the real object 80 that are transmitted from the HMD 10, the radio-wave-based position estimator 61 calculates a candidate range in which there may exist the real object 80. Then, a position within the calculated candidate range is calculated as the radio-wave-based position.

For example, a position, in the space S1, that is in each of the circles C1 to C3 respectively centered at the positions PH1 to PH3 of the HMD 10 illustrated in FIGS. 7A, 7B, and 7C, is calculated as the candidate range. Considering an error in distance, a range slightly outwardly larger than the circle may be calculated as the candidate range.

Then, on the basis of the idea that the real object 80 exists at all of the points of intersection of the circles C1 to C3, all of the points of intersection at which the circles C1 to C3 intersect each other are calculated. The candidate range is narrowed down on the basis of the calculated points of intersection. For example, all of the points of intersection of the circles C1 to C3 are extracted, and specified ranges respectively centered at the respective points of intersection are calculated as the candidate range.

In the example illustrated in FIG. 7A, a point of intersection Pa at which the three circles C1 to C3 intersect, a point of intersection Pb at which the circles C1 and C2 intersect, and a point of intersection Pc at which the circles C1 and C3 intersect are calculated. Specified ranges respectively centered at the respective points of intersection are calculated as a candidate range.

Note that the point of intersection at which all of the circles C1 to C3 intersect is Pa. However, due to the two positions PH1 and PH2 of the HMD 10 being situated close to each other, the points of intersection Pb and Pc are also situated close to each other. Thus, considering a measurement error in distance, it is not possible to deny the possibility that the points of intersection Pb and Pc are also points of intersection at which all of the circles C1 to C3 intersect.

Thus, ranges respectively centered at the respective points of intersection are calculated as a candidate range. The radio-wave-based position estimator 61 calculates a position within the candidate range as a radio-wave-based position. For example, one of the points of intersection Pa to Pc is calculated as a radio-wave-based position. Of course, the calculation is not limited to this, and another position within the candidate range may be calculated.

In the state illustrated in FIG. 7A, it is difficult to specify a point of intersection at which all of the circles C1 to C3 intersect, and the candidate range is wide. Thus, the reliability of a radio-wave-based position is low. In the example illustrated in FIG. 7A, the reliability of a radio-wave-based position is 0.3.

It is assumed that the position PH3 of the HMD 10 is moved so that the state is changed from the state illustrated in FIG. 7A to the state illustrated in FIG. 7B. The points of intersection Pb and Pc are situated away from each other, and the point of intersection Pa is more likely to be a point of intersection at which all of the circles C1 to C3 intersect. Thus, for example, the candidate ranges respectively centered at the respective points of intersection Pb and Pc are narrowed down. This results in a reduction in the size of the entire candidate range.

The radio-wave-based position estimator 61 calculates, as a radio-wave-based position, the point of intersection Pa that is more likely to be a point of intersection at which all of the circles C1 to C3 intersect, not the point of intersection Pb or Pc for which the candidate range is narrowed down. In response to the candidate range being narrowed down, the reliability determination section 62 sets the reliability higher (0.7).

It is assumed that the position PH3 of the HMD 10 is moved so that the state is changed from the state illustrated in FIG. 7B to the state illustrated in FIG. 7B. In this case, the point of intersection Pa is much more likely to be a point of intersection at which all of the circles C1 to C3 intersect. Thus, for example, the ranges respectively centered at the respective points of intersection Pb and Pc are excluded from the candidate range. In other words, only a range centered at the point of intersection Pa is calculated as the candidate range.

The radio-wave-based position estimator 61 calculates the point of intersection Pa as the radio-wave-based position. In response to the candidate range being narrowed down, the reliability determination section 62 sets the reliability much higher (0.8).

When the position of the HMD 10 is moved, as described above, information regarding a candidate range is accumulated with time by constantly monitoring a distance to the real object 80, and this results in being able to narrow down the candidate range. Then, it is possible to calculate a highly reliable radio-wave-based position at the end.

In the example illustrated in FIGS. 7A, 7B, and 7C, the point of intersection at which all of the circles C1 to C3 intersect converges to the point of intersection Pa, and then indicates the same point for a longer time. Thus, it is possible to calculate the point of intersection Pa as a highly reliable radio-wave-based position. It is assumed that the position of the HMD 10 is moved and there exists again a plurality of points of intersection at which the circles C1 to C3 intersect, as illustrated in FIG. 7A. In this case, it is possible to determine, from a history in the past, that no real object 80 exists at a point of intersection that has been increased once again. Thus, there is not, for example, a great decrease in reliability.

Note that, depending on a relationship among the respective positions of the HMD 10, such as the case in which the state illustrated in FIG. 7C is an initial state, it is also possible to calculate a highly reliable radio-wave-based position at a very early stage.

As described above, it is possible to calculate a radio-wave-based position and the reliability by narrowing down a calculable range (candidate range) in which there exists a point of intersection at which all of the circles intersect, on the basis of the position of the HMD 10 and the distance to the real object 80. If the number of the HMD 10, that is, the number of users 1 is larger, it is possible to further reduce the time until the position of the real object 80 is estimated, and to improve the accuracy in estimation.

In the example illustrated in FIGS. 7A, 7B, and 7C, the candidate range is calculated on the basis of information regarding the circles C1 to C3 and information regarding the points of intersection Pa to Pc in each state. Without being limited thereto, the candidate range may be calculated on the basis of information regarding a history of the circles C1 to C3 in the past and information regarding a history of the points of intersection Pa to Pc in the past.

For example, a range in which there exists a point of intersection at which all of the circles including circles calculated in the past intersect, may be calculated. In this case, it is possible to calculate a highly reliable radio-wave-based position at the end, since the number of circles is increased as the user 1 moves. Further, it is also possible to accurately calculate a radio-wave-based position when the number of users 1 is a small number such as one or two.

In the example illustrated in FIGS. 7A, 7B and 7C, the reliability of a radio-wave-based position is calculated on the basis of the size of a candidate range. Other parameters may be used as parameters used to determine the reliability. For example, the reliability may be calculated on the basis of, for example, the number of users 1 (the number of HMDs 10), the stability of a radio wave of the beacon signal 5, the rate of change in the intensity of a radio wave of the beacon signal 5, or the length of time necessary to narrow down a candidate range. Further, any determination method depending on accumulation of information regarding a candidate range may be adopted.

A specific algorithm used to calculate a radio-wave-based position and the reliability are not limited, and any technique may be used. Further, any machine-learning algorithm may be used.

Returning to FIG. 6, the camera-based position estimator 53 includes an image recognition section 57 and a reliability determination section 58. The image recognition section 57 detects the real object 80 from a captured image of a real space. In the present embodiment, a model image in the recognition DB 42 illustrated in FIG. 3 is used.

The image recognition section 57 performs matching processing on the captured image to check against a model image of the real object 80, and determines whether the captured image includes the real object 80. When the real object 80 is included in the captured image, the real object 80 in the captured image is compared to the model image of the real object 80. Then, on the basis of the size, the shape, and the like of the real object 80 in the captured image and the size, the shape, and the like in the real object 80 in the model image, it is determined how far apart the real object 80 is situated from the outward-oriented camera 15 at which angle with respect to the outward-oriented camera 15 upon capturing the image of the real object 80. Then, a relative position of the real object 80 with respect to the position of the outward-oriented camera 15 (the position of the HMD 10) is calculated.

A specific algorithm used to perform matching processing using a model image is not limited. Any image recognition technique such as an edge detection or a projective transformation may be used. Further, any machine-learning algorithm may be used.

The camera-based position estimator 53 calculates a position of the real object 80 in the map data 41 of the space S1 on the basis of the relative position of the real object 80 with respect to the HMD 10 that is calculated by the image recognition section 57, and on the basis of the self-position of the HMD 10 that is acquired from the self-position estimator 51. The calculated position of the real object 80 is a camera-based position.

The reliability determination section 58 determines the reliability of the calculated camera-based position. In the present embodiment, the reliability is calculated on the basis of a result of the matching processing performed by the image recognition section 57 on the captured image to check against a model image.

For example, the reliability is calculated on the basis of a degree of coincidence between the real object 80 in the captured image and the model image of the real object 80. For example, a relatively high reliability is set when the real object 80 having the same size and the same shape as the model image of the real object 80 is detected. On the other hand, a relatively low reliability is set when the real object 80 being smaller in size than the model image and of which an image-capturing angle is different from that of the model image (the image of the real object 80 is captured from an oblique direction), is detected.

Further, for example, in the matching processing performed every time a captured image is captured, a high reliability is calculated due to an increase in the number of times the real object 80 in a captured image coincides with a model image, an increase in the number of the same angles of the real object 80 in the captured image as those of the model image, or the like. Furthermore, the reliability may be calculated on the basis of a position at which the real object 80 has been detected in a captured image. Moreover, any parameters such as an image-capturing condition may be used to calculate the reliability. A specific algorithm used to determine the reliability of a camera-based position is not limited, and, for example, any machine-learning algorithm or the like may be used.

The camera-based position estimator 53 outputs a camera-based position and the reliability to the real-object position estimator 54. Note that, when the real object 80 has not been detected from a captured image by the image recognition section 57, information indicating that the real object 80 has not been detected is output to the real-object position estimator 54.

Figure 8:
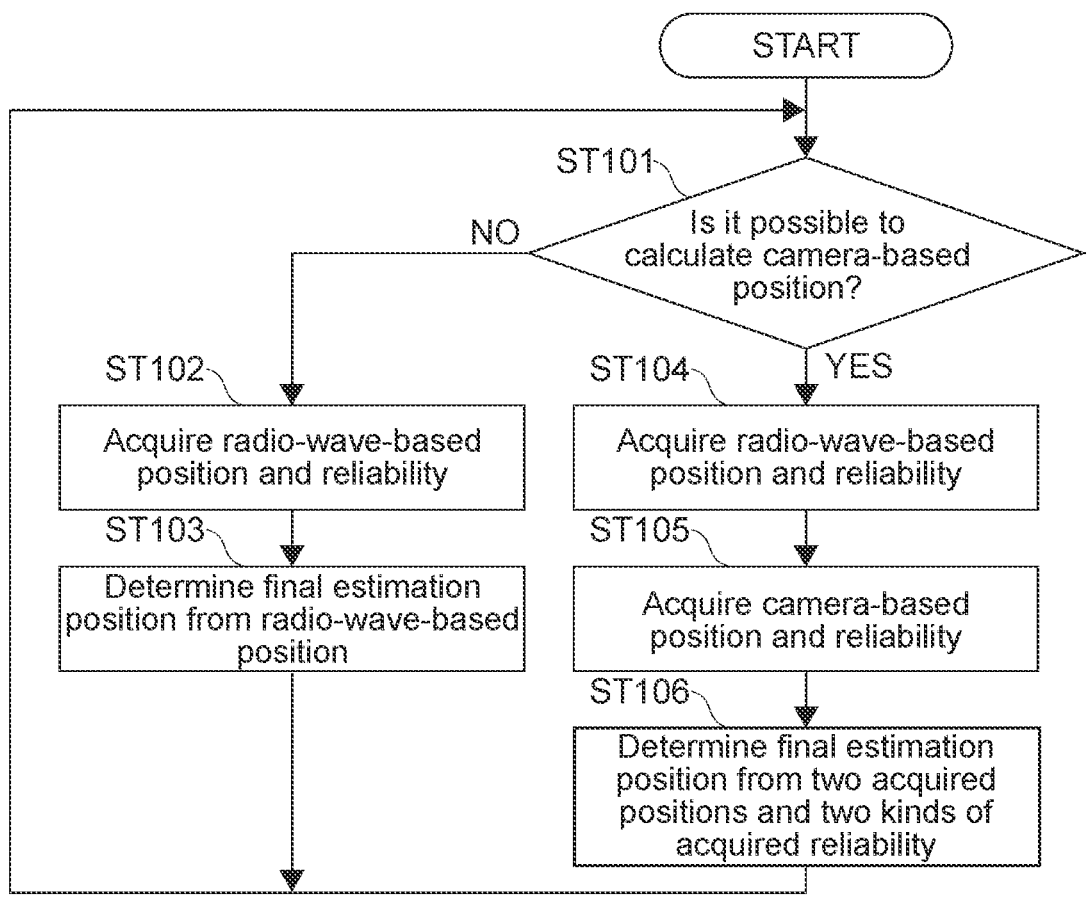
FIG. 8 is a flowchart illustrating an example of an operation of a real-object position estimator.

FIG. 8 is a flowchart illustrating an example of an operation of the real-object position estimator 54. First, it is determined whether it is possible to calculate a camera-based position (Step 101). For example, this determination is performed on the basis of whether information indicating that the real object 80 is undetectable has been received from the camera-based position estimator 53. Of course, the determination is not limited to this.

When it is not possible to calculate the camera-based position (NO in Step 101), a radio-wave-based position and the reliability are acquired (Step 102). Then, the final estimation position P2 that is a final estimation position is calculated on the basis of the radio-wave-based position (Step 103). Typically, the radio-wave-based position is adopted as the final estimation position P2 of the real object 80 without any change. Without being limited thereto, calculation or the like may be performed on the basis of the radio-wave-based position and the reliability to calculate the final estimation position P2.

Note that, even when the real object 80 is included in the captured image (within an image-capturing range), it may be determined that it is not possible to calculate a camera-based position. For example, there is a possibility that it will not be possible to detect the real object 80 due to a factor related to an image-capturing environment such as light from behind. Alternatively, there is a possibility that it will not be possible to calculate a camera-based position when, for example, the real object 80 appears in a small size in a captured image at the corner of the captured image at an angle such that the real object 80 is oriented obliquely. In such a case, the radio-wave-based position acquired in Step 102 may be a position included in the captured image (a position within the field of view of the user 1).

When it is possible to calculate the camera-based position (YES in Step 101), the radio-wave-based position and the reliability are acquired (Step 104). Further, the camera-based position and the reliability are acquired (Step 105). Then, the final estimation position P2 that is a final estimation position is calculated on the basis of the radio-wave-based position and the reliability, and on the basis of the camera-based position and the reliability (Step 106).

In other words, in the present embodiment, the position of the real object 80 is recalculated on the basis of the two acquired positions and the two kinds of acquired reliability, and is used as a final result.

Examples of the calculation of the final estimation position P2 include the following. Two points that are the radio-wave-based position and the camera-based position are connected using a straight line. Then, an intermediate point in the straight line is calculated as the final estimation position P2 on the basis of the reliability of the radio-wave-based position and the reliability of the camera-based position.

For example, it is assumed that the radio-wave-based position is indicated by (0,0,10) and the reliability is 0.5. It is assumed that the camera-based position is indicated by (0,0,0) and the reliability is 0.5. In this case, a position (0,0,5) just intermediate between the radio-wave-based position and the camera-based position is calculated as the final estimation position P2.

Thereafter, when, for example, the real object 80 is out of the field of view of the user 1, the process is switched from NO in Step 101 to Step 102, and the final estimation position P2 is calculated on the basis of the radio-wave-based position and the reliability.

Note that, when the position is estimated on the basis of a radio wave, a position based on an angle or a shape of the real object 80 is not calculated. Thus, it is often the case that the reliability is only increased up to a certain level. On the other hand, when a captured image includes the real object 80, the reliability of a camera-based position is increased at a relatively high increase rate. Thus, when the user 1 is looking at the real object 80, the reliability of a camera-based position is often higher than that of a radio-wave-based position at the end.

For example, when the reliability of a camera-based position exhibits a value greater than a specified threshold, the camera-based position may be calculated as the final estimation position P2. In other words, when the reliability of the camera-based position is high, the camera-based position may be used as the final estimation position P2 without any change, without using the radio-wave-based position.

It is often the case that the camera-based position is accurate and the deviation of the camera-based position is small. On the other hand, the radio-wave-based position is relatively likely to deviate. Thus, when the reliability of a camera-based estimation value is high, it is possible to sufficiently suppress the deviation of the final estimation position P2 by calculating the camera-based position as the final estimation position P2. Note that a specific magnitude of the threshold is not limited. Further, being greater than a threshold includes both a case in which a state of exhibiting the same value as the threshold is included (a case of being equal to or greater than), and a case in which the state of exhibiting the same value as the threshold is not included.

Further, the method for setting a specific value to be the reliability is not limited. In the present embodiment, the value of the reliability is set to be in a range of from 0 to 1. Moreover, the value of the reliability may be set by any method.

The calculated final estimation position P2 is output to the AR-representation control section 55. The AR-representation control section 55 controls AR representation on the basis of the final estimation position P2.

Figure 9:
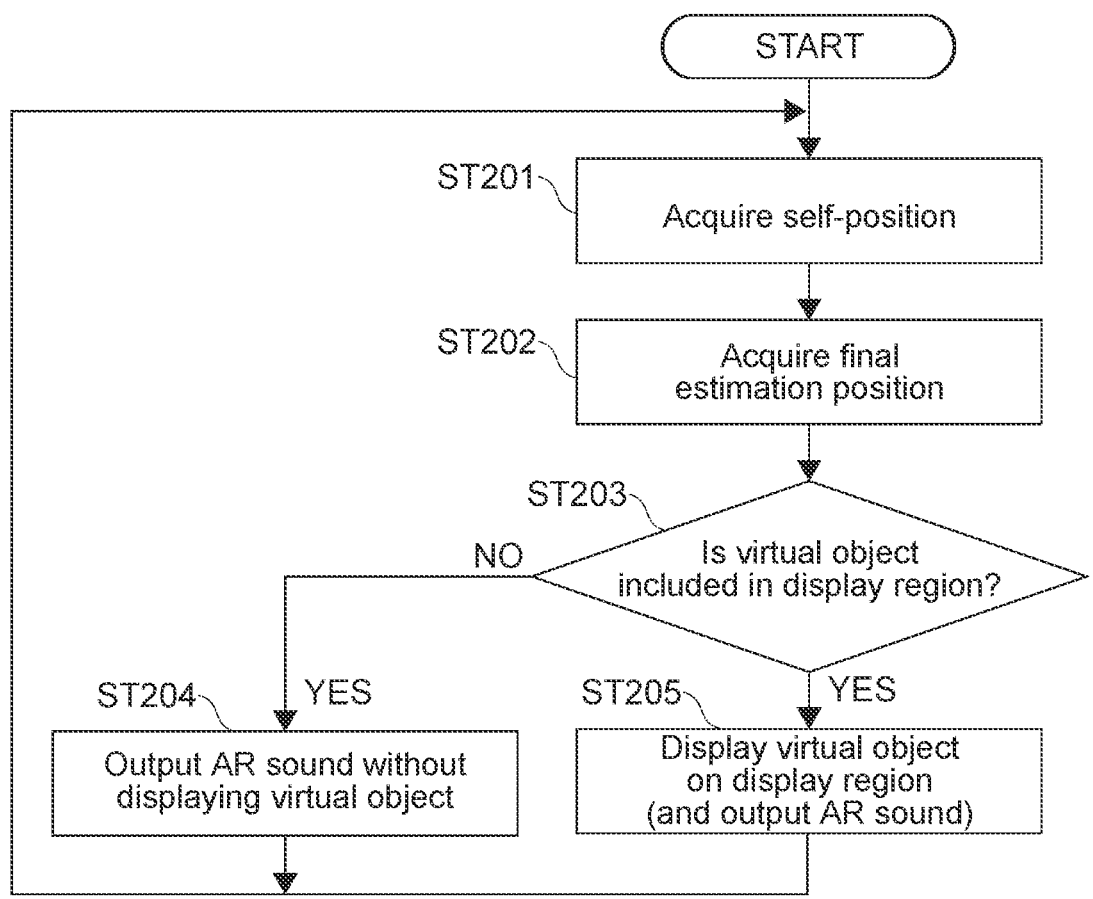
FIG. 9 is a flowchart illustrating an operation of an AR-representation control section.
Figure 10:
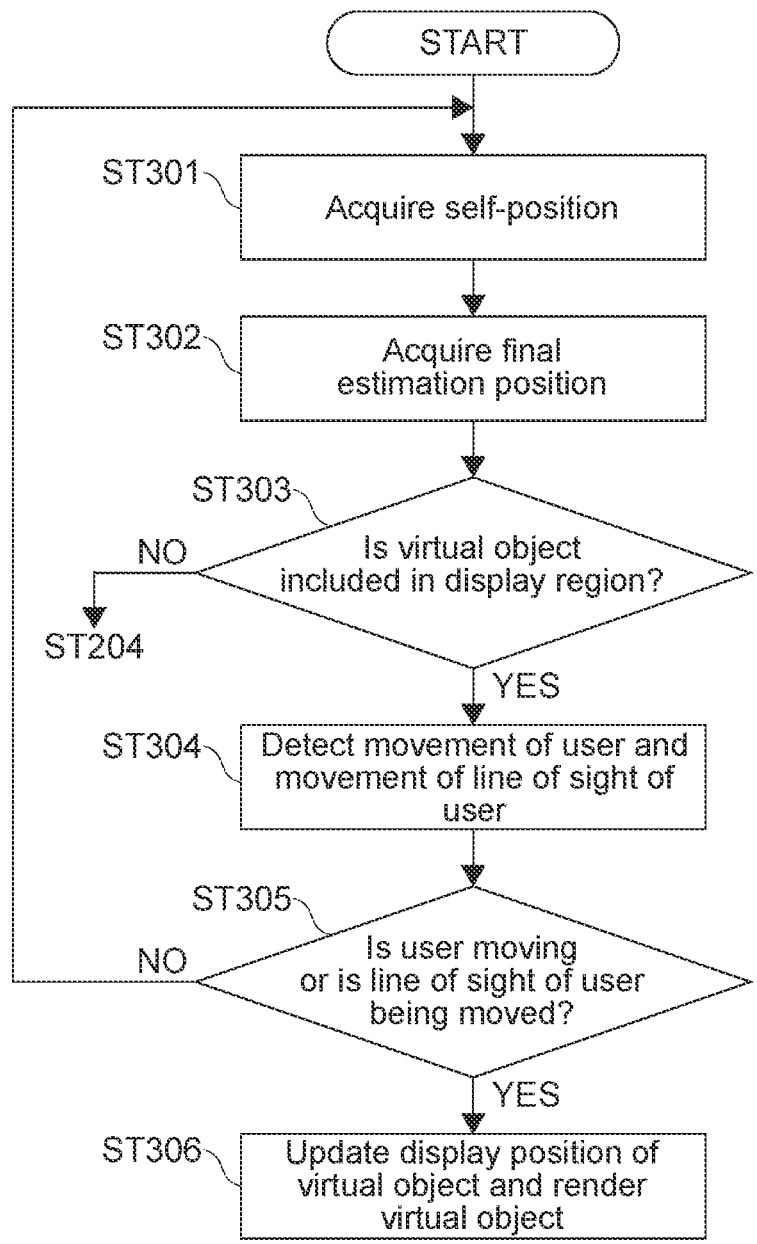
FIG. 10 is a flowchart illustrating an example of updating a display position of a virtual object.
Figure 11:
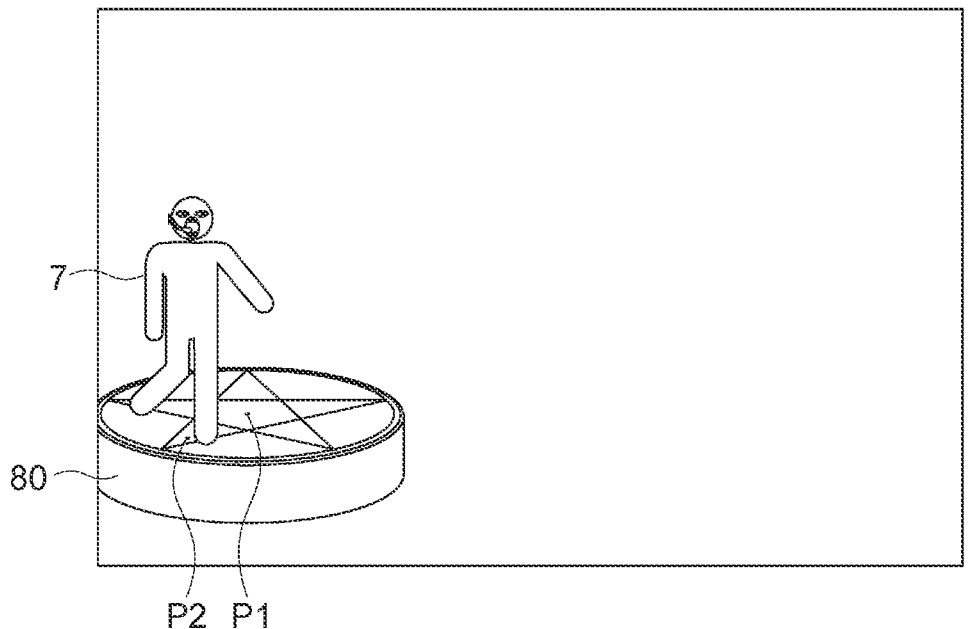
FIG. 11 schematically illustrates an example of AR representation.
Figure 12:
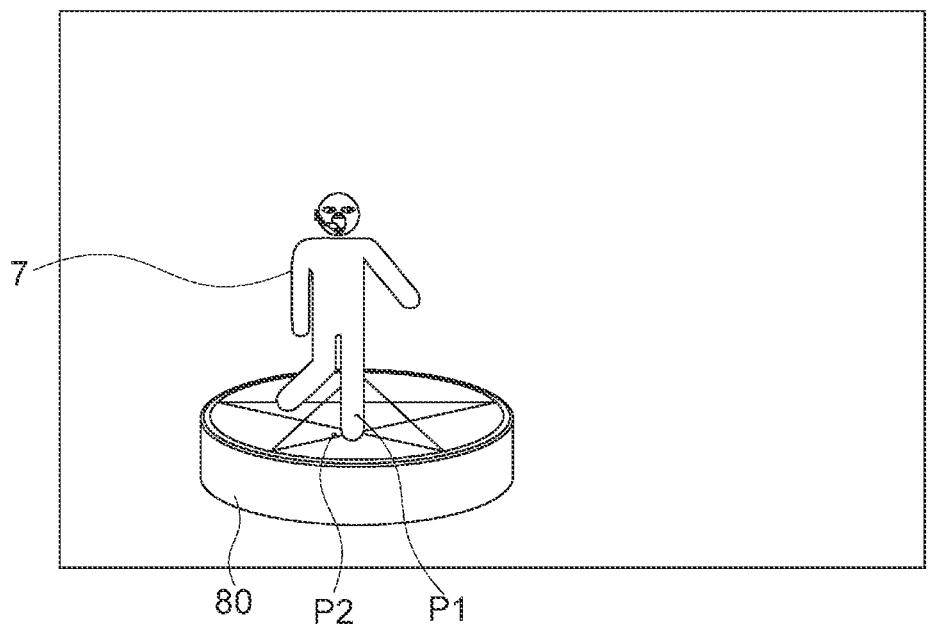
FIG. 12 schematically illustrates an example of the AR representation.
Figure 13:
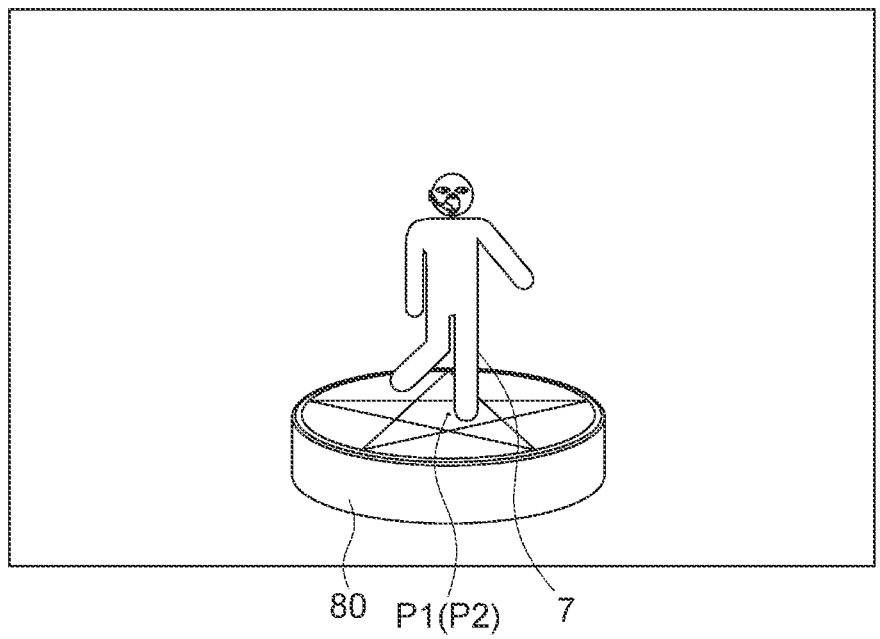
FIG. 13 schematically illustrates an example of the AR representation.

FIGS. 9 and 10 are flowcharts illustrating examples of an operation of the AR-representation control section 55. FIGS. 11 to 13 schematically illustrate examples of AR representation.

As illustrated in FIG. 9, a self-position of the HMD 10, and the final estimation position P2 calculated by the real-object position estimator 54 are acquired (Steps 201 and 202). It is determined whether the virtual object 7 is included in a display region of the transmissive display 13 (Step 203). In other words, it is determined whether the virtual object 7 is situated at a position visible through the display region when the virtual object 7 is represented on the basis of the final estimation position P2.

For example, a rendering range (a display range) of the virtual object 7 is calculated on the basis of the final estimation position P2. When the calculated rendering range is not included in the display region, it is determined to be NO in Step 203. When at least a portion of the calculated rendering range is included in the display region, it is determined to be YES in Step 203. Note that determination may be performed in Step 203 on the basis of whether the entire virtual object 7 is included in the display region.

When the virtual object 7 is not included in the display region (NO in Step 203), the virtual object 7 is not displayed, and only output of AR sound is performed. In other words, a song that the virtual object 7 is singing is output from the speaker 20, with the final estimation position P2 being a position of a virtual sound source. Note that even when the virtual object 7 is not included in the display region, the final estimation position P2 is updated in order to, for example, control the position of the virtual sound source.

When the virtual object 7 is included in the display region (YES in Step 203), the virtual object 7 is displayed and AR sound is output. The virtual object 7 is displayed on the rendering range calculated on the basis of the final estimation position P2. The user 1 can visually confirm the virtual object 7 who is standing on the real object 80 and is singing a song.

For example, it is assumed that, in a state in which the real object 80 is not visible to the user 1, the user 1 shifts his/her field of view (moves his/her line of sight) to the left in a direction from which a song is heard. It is assumed that, consequently, the user 1 gets a view of the real object 80 and the virtual object 7 on the left in his/her field of view, as illustrated in FIG. 11.

The final estimation position P2 is calculated on the basis of a radio-wave-based position immediately after the real object 80 enters the field of view, as illustrated in FIG. 11. Thus, the final estimation position P2 may slightly deviates from the actual position P1 of the real object 80. However, it is possible to display the virtual object 7 at an approximately correct position.

It is assumed that the user 1 in a stationary state is continuously looking at the virtual object 7 without moving his/her line of sight from the state illustrated in FIG. 11. During that period of time, the camera-based position is calculated and its reliability is increased. Thus, the final estimation position P2 of the real object 80 is updated and gets closer to the actual position P1 in Step 106 illustrated in FIG. 8. This results in also updating a display position of the virtual object 7.

FIG. 10 is a flowchart illustrating an example of updating a display position of the virtual object 7. Steps 301 to 303 are similar to Steps 201 to 203 illustrated in FIG. 9. Note that, when the virtual object 7 is not included in the display region in Step 203, the update of the display position is terminated, and the process moves on to Step 204 illustrated in FIG. 9.

When the virtual object 7 is included in the display region (YES in Step 303), the movement (motion) of the user 1 and the movement of the line of sight of the user 1 are detected (Step 304). The movement of the user 1 and the movement of the line of sight of the user 1 can be detected on the basis of a result of detection performed by the sensor section 30 and captured images captured by the inward-oriented camera 14 and the outward-oriented camera 15. A specific algorithm used to detect the movement of the user 1 and the movement of the line of sight of the user 1 is not limited, and any technique may be used. Further, any machine-learning algorithm may be used.

It is determined whether the user 1 is moving or the line of sight of the user 1 is being moved (Step 305). When the user 1 is not moving and the line of sight of the user 1 is also not being moved, it is determined to be NO in Step 305, and the process returns to Step 301.

When the user 1 is moving or the line of sight of the user 1 is being moved, it is determined to be YES in Step 305, and the process moves on to Step 306. In Step 306, the display position of the virtual object 7 is updated, and the virtual object 7 is rendered. Of course, the display position of the virtual object 7 also remains unchanged when the final estimation position P2 remains unchanged.

As described above, in the update illustrated in FIG. 10, a change in the display position of the virtual object 7 is restricted when the user 1 is not moving and is stationary and when the line of sight of the user 1 is not being moved. Then, the display position of the virtual object 7 is changed while the user 1 is moving or while the line of sight of the user 1 is being moved.

It is assumed that, for example, the user 1 in a stationary state is continuously looking at the virtual object 7 without moving his/her line of sight from the state illustrated in FIG. 11. During that period of time, the camera-based position is calculated and its reliability is increased. Thus, the final estimation position P2 of the real object 80 is updated and gets closer to the actual position P1 in Step 106 illustrated in FIG. 8. However, the display position of the virtual object 7 is not updated, and the virtual object 7 does not move from the state illustrated in FIG. 11.

On the other hand, it is assumed that the user 1 moves his/her line of sight to the left from the state illustrated in FIG. 11, and moves the real object 80 to the center of the field of view, as illustrated in FIGS. 12 and 13. During that period of time, the camera-based position is calculated and its reliability is increased. Thus, the final estimation position P2 of the real object 80 is updated and gets closer to the actual position P1 in Step 106 illustrated in FIG. 8.

The AR-representation control section 55 changes the displayed position of the virtual object 7 on the basis of the movement of the line of sight of the user 1. Consequently, the virtual object 7 moves to the center of the real object 80 while the user 1 is moving his/her line of sight, as illustrated in FIGS. 11 to 13.

When the display position of the virtual object 7 is updated in a state in which the user 1 in a stationary state is looking at the virtual object 7 without moving his/her line of sight, it is not possible for the user 1 to determine whether the virtual object 7 is moving or the position is being corrected. This may result in causing the user 1 to feel unnatural.

Thus, as illustrated in FIG. 10, when the user 1 is not moving and when the line of sight of the user 1 is not being moved, the display position of the virtual object 7 will not be moved even if there is a change in the final estimation position P2. The display position of the virtual object 7 is changed when the user 1 is moving or the line of sight of the user 1 is being moved. When the user 1 is moving or the line of sight of the user 1 is being moved, the user 1 is less likely to feel unnatural even if the virtual object 7 is slightly moved. Accordingly, it is possible to naturally move the virtual object 7, as illustrated in FIGS. 11 to 13.

As described above, in the AR providing system 100 according to the present embodiment, the final estimation position P2 is calculated as a reference position used to represent virtual content related to the real object 80, on the basis of a camera-based position of the real object 80 that is calculated on the basis of a captured image, and on the basis of a radio-wave-based position of the real object 80 that is calculated on the basis of the beacon signal 5 output to a real space. This makes it possible to provide a high-quality virtual experience.

The AR makes it possible to superimpose, on a real object, virtual content (virtual objects) in various forms such as text, an icon, or animation, and to present the virtual content superimposed on the real object to the user. There is a need to accurately specify a position when a virtual object is superimposed on a real object, since the user will be caused to feel unnatural unless the virtual object is exactly superimposed on the real object.

On the other hand, there is also a method for representing AR using not only a visual sense but also an auditory sense. The AR may also be used for the following application: an AR object out of the field of view produces sound to indicate that a real object exists in a direction of the sound. Further, with respect to sound out of the field of view, a necessary degree of accuracy in specifying a position is often lower than the necessary degree of accuracy when a real object is within the field of view.

For example, there is a need to once measure the position of a real object in the field of view when a position estimation is performed using image recognition. Thus, it is not natural that a direction from which sound is heard be within the field of view in advance for the purpose of causing a user to turn to the direction. Thus, there is a need for a method other than image recognition taking into consideration sound AR.

The AR providing system 100 according to the present embodiment makes it possible to provide effects indicated below.

In a measurement of a position of the real object 80 out of the field of view, it is also possible to specify the position of the real object 80 out of the field of view using an output wave such as a radio wave.

With respect to a position measurement within the field of view, it is possible to perform a position measurement with a high degree of accuracy by using image recognition with a higher degree of accuracy than a position measurement using an output wave such as a radio wave.

Since it is possible to calculate both a radio-wave-based position and a camera-based position, it is possible to perform switching as appropriate to select an optimal method for position measurement according to the situation.

When the position recognition is changed from a radio-wave-based position recognition to a camera-based position recognition, it is possible to gradually switch the position of the real object 80 using the reliability of the radio-wave-based position and the reliability of the camera-based position. This makes it possible to reduce unnaturalness.

Since there is no need to specify and store the position of the real object 80 in an application, it is possible to reduce load.

There is no need to arrange another apparatus or the like of which the absolute position is known in order to specify the position of a real object, and this makes it possible to reduce costs.

It is possible to calculate the position of the real object 80 and to output AR sound, without performing a camera-based position recognition.

It is also possible to specify the position of the real object 80 in a state in which image recognition is not effective.

The use of a result of a radio-wave-based position recognition makes it possible to narrow down a camera-based-recognition-target range (such as range of an image on which matching processing is to be performed). This makes it possible to reduce load, improve the accuracy, and to speed up the recognition.

OTHER EMBODIMENTS

The present technology is not limited to the embodiments described above, and can achieve various other embodiments.

Figure 14:
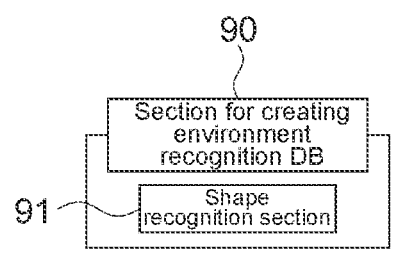
FIG. 14 is a block diagram illustrating an example of a configuration of a section for creating an environment recognition DB.
Figure 15:
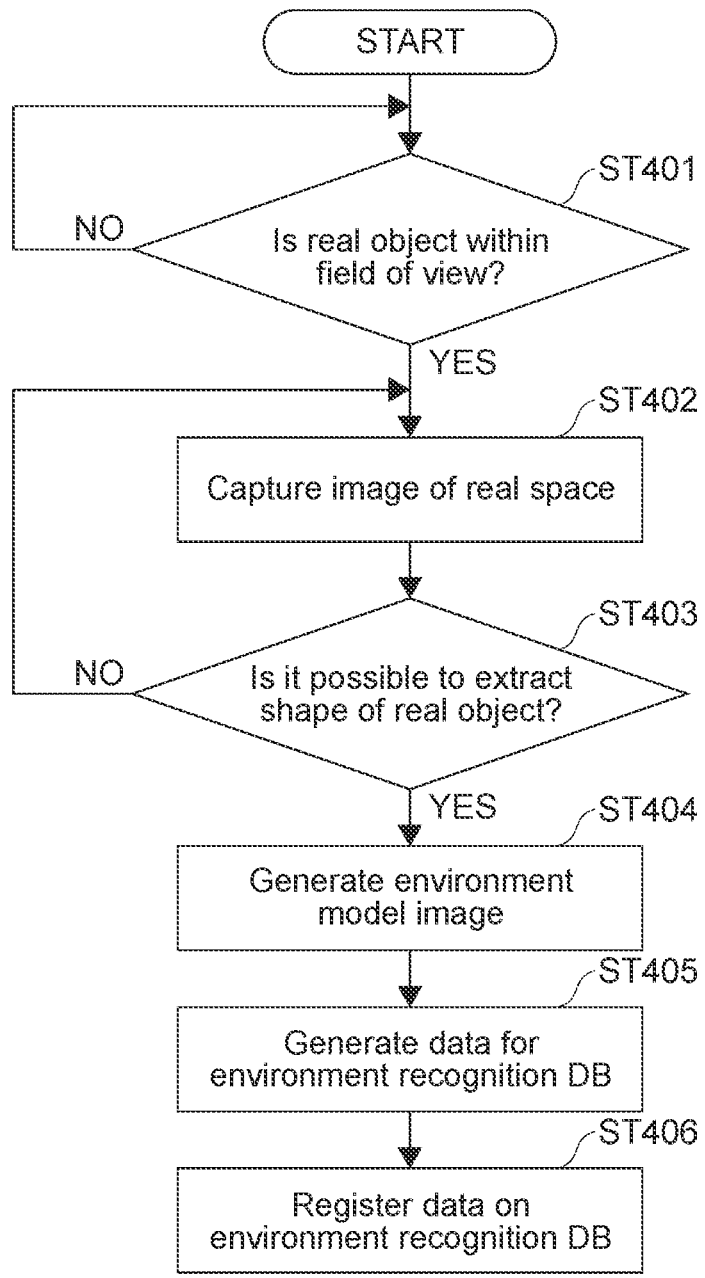
FIG. 15 is a flowchart illustrating an example of processing performed by the section for creating an environment recognition DB.

FIG. 14 is a block diagram illustrating an example of a configuration of a section for creating an environment recognition DB. FIG. 15 is a flowchart illustrating an example of processing performed by the section for creating an environment recognition DB.

For example, a section 90 for creating an environment recognition DB illustrated in FIG. 14 is implemented by the controller 50 illustrated in FIG. 3. The section 90 for creating an environment recognition DB is capable of newly creating a model image used by the camera-based position estimator 53. For example, in order to cope with an environmental change caused when the HMD 10 is used outdoors, images of the real object 80 are captured in various places in various situations, and this results in creating a model image that is capable of providing a high degree of accuracy in recognition even in an outdoor environment.

For example, an environment recognition DB is created in the storage 40 separately from the recognition DB 42. A model image created by the section 90 for creating an environment recognition DB is stored in the environment recognition DB. The environment recognition DB is updated as necessary such that the environment recognition DB can cope with various environments. Of course, the present technology is not limited to the case in which two recognition DBs are separately created.

In the present embodiment, the section 90 for creating an environment recognition DB corresponds to a model image generator that generates a model image on the basis of a captured image. The model image created by the section 90 for creating an environment recognition DB may be hereinafter referred to as an environment model image.

Typically, an environment model image is created when the real object 80 is not detected from a captured image despite the fact that the radio-wave-based position is within the field of view, and it is not possible to calculate the camera-based position. Accordingly, it is also possible to create an environment model image with which the real object 80 can be detected with a high degree of accuracy in an environment in which it is difficult to detect the real object 80, such as in a state of being exposed to the glare of the evening sun.

Note that an environment model image may be created when, for example, the real object 80 can be detected from a captured image and the camera-based position can be calculated, but the reliability is very low.

As illustrated in FIG. 15, whether the real object 80 is within the field of view of the user 1, is monitored (Step 401). For example, it is determined whether the radio-wave-based position is within the field of view. Here, the reliability of the radio-wave-based position may be used for the determination. For example, when the radio-wave-based position is within the field of view and the reliability of the radio-wave-based position exhibits a value greater than a specified threshold, it may be determined that the real object 80 is within the field of view.

When the real object 80 is within the field of view (YES in Step 401), an image of a real space including the field of view is captured, and the captured image is generated (Step 402). The captured image is output to a shape recognition section 91 of the section 90 for creating an environment recognition DB.

The shape recognition section 91 determines whether it is possible to extract the shape of the real object 80 from the captured image (Step 403). When it is not possible to extract the shape of the real object 80 (NO in Step 403), the process returns to Step 402, and an image of the real space is captured again.

When it is possible to extract the shape of the real object 80 (YES in Step 403), an image of the real object 80 is extracted from the captured image, and an environment model image is generated (Step 404). An ID, information regarding an image-capturing environment (such as weather, and a date and time) are associated with the environment model image, and the environment model image is generated as data for an environment recognition DB (Step 405). The generated data for an environment recognition DB is registered on an environment recognition DB (Step 406).

The creation of an environment recognition DB makes it possible to operate the AR providing system 100 even if the recognition DB of the real object 80 is not provided in advance. It is possible to calculate a camera-based position and the reliability using an environment model image created by the section 90 for creating an environment recognition DB.

Further, it is also possible to replace the real object 80 with another alternative that is capable of outputting the beacon signal 5. When an alternative is used, a plurality of templates of the alternative is held in advance, and a template of an alternative having a shape closest to the shape of the real object included in an environment model image in an environment recognition DB, is used. Further, the templates respectively have determined points paring up with each other. However, it may be possible to perform editing in advance using, for example, a software development kit (SDK).

For example, in order to perform AR representation, such as the fact that a virtual object jumps out of the center of a box such as a jack-in-the-box, there is a need to know a center portion of the box. Since the present technology makes it possible to change a point of causing an event by comparing with a template, it is also possible to cause an event of AR representation from the center of a real object when an alternative is used.

A beacon signal has been described above as an example of an output wave that is output by the real object 80. Without being limited thereto, another radio wave such as a Wi-Fi radio wave may be used as the output wave. For example, if a Wi-Fi module or the like is included in a reception-side device, it will be possible to calculate a distance to a real object on the basis of the intensity of a radio wave. Further, a sound wave or the like may be used as the output wave. For example, the inclusion of a microphone or the like in a reception-side device makes it possible to calculate a distance to a real object on the basis of a sound wave. Furthermore, a beacon signal different from a BLE beacon may be used as a beacon signal.

When a sound wave is used as the output wave, the position of a real object in map data is estimated on the basis of a distance to the real object that is calculated on the basis of the sound wave. The estimated position of the real object may be referred to as a sound-based estimation position. The sound-based estimation position is a concept included in an output-wave-based estimation position.

The example in which a real object does not move has been described above. Without being limited thereto, the present technology is also applicable when the real object moves. For example, when there exists a plurality of users each using the HMD, it is possible to estimate the position of a moving real object on the basis of an output wave that is output from the real object. Alternatively, it is also possible to estimate the position of a moving real object when an apparatus including a function of communicating with a server apparatus and a function of outputting an output wave is separately provided, the provided apparatus being an apparatus of which an absolute position in map data is fixed and that does not move.

The function of the server apparatus 60 illustrated in FIG. 6 may be included in the HMD 10. In this case, the HMD 10 receives information regarding a distance from another HMD 10 (another apparatus) to a real object, the distance being calculated by the other HMD 10 on the basis of an output wave. Then, it is possible to calculate a candidate range in which there may exist the real object, on the basis of the received information regarding the distance from the other HMD 10 to the real object.

Note that the information regarding a distance from another HMD 10 to a real object is, for example, the distance from the other HMD 10 to the real object. Alternatively, information regarding a candidate range calculated by the other HMD 10 may be used as the information regarding the distance from the other HMD 10 to the real object.

The example in which map data of the space S1 is held in advance has been described above. Without being limited thereto, the map data may be updated, created, and acquired in real time.

The present technology is also applicable when a video see-through HMD is used. Further, without being limited to devices such as an HMD used by being attached to the head of a user, the present technology is also applicable to AR representation using, for example, a smartphone, a tablet terminal, and a personal computer (PC).

The example in which the HMD is an embodiment of the information processing apparatus according to the present technology, has been described above. However, the information processing apparatus according to the present technology may be implemented by any computer that is provided separately from the HMD and connected to the HMD by wire or wirelessly. For example, the information processing method according to the present technology may be performed by a cloud server. Alternative, the information processing method according to the present technology may be performed by the HMD and another computer operating cooperatively.

In other words, the information processing method and the program according to the present technology can be performed not only in a computer system formed of a single computer, but also in a computer system in which a plurality of computers operates cooperatively. Note that, in the present disclosure, the system refers to a set of components (such as apparatuses and modules (parts)) and it does not matter whether all of the components are in a single housing. Thus, a plurality of apparatuses accommodated in separate housings and connected to each other through a network, and a single apparatus in which a plurality of modules is accommodated in a single housing are both the system.

The execution of the information processing method and the program according to the present technology by the computer system includes, for example, both a case in which the calculation of a camera-based position and the reliability, the calculation of a non-camera estimation position and the reliability, the control of representation of virtual content, and the like are executed by a single computer; and a case in which the respective processes are executed by different computers. Further, the execution of each process by a specified computer includes causing another computer to execute a portion of or all of the process and acquiring a result of it.

In other words, the information processing method and the program according to the present technology are also applicable to a configuration of cloud computing in which a single function is shared and cooperatively processed by a plurality of apparatuses through a network.

The information processing apparatus (HMD), the server apparatus, the real object, the virtual object, each processing flow of the information processing apparatus, and the like described with reference to the respective figures are merely embodiments, and any modifications may be made thereto without departing from the spirit of the present technology. In other words, for example, any other configurations or algorithms for purpose of practicing the present technology may be adopted.

At least two of the features of the present technology described above can also be combined. In other words, various features described in the respective embodiments may be combined discretionarily regardless of the embodiments. Further, the various effects described above are not limitative but are merely illustrative, and other effects may be provided.

Note that the present technology may also take the following configurations.

(1) An information processing apparatus, including:
    a first acquisition section that acquires a camera-based position indicating a position of a real object, the camera-based position being determined on the basis of a captured image of a real space in which there exists the real object;
    a second acquisition section that acquires an output-wave-based estimation position indicating the position of the real object, the output-wave-based estimation position being determined on the basis of an output wave that is output to the real space from a position that corresponds to the real object; and
    a determination section that determines a reference position used to represent virtual content related to the real object, on the basis of the camera-based position and the output-wave-based estimation position.

(2) The information processing apparatus according to (1), in which
    the determination section determines a final estimation position of the real object as the reference position.

(3) The information processing apparatus according to (1) or (2), in which
    the output wave includes at least one of a radio wave or a sound wave.

(4) The information processing apparatus according to any one of (1) to (3), in which
    the first acquisition section acquires first reliability related to the camera-based position,
    the second acquisition section acquires second reliability related to the output-wave-based estimation position, and
    the determination section determines the reference position on the basis of the first reliability and the second reliability.

(5) The information processing apparatus according to (4), in which
when the first reliability exhibits a value greater than a specified threshold, the determination section determines the camera-based position as the reference position.
(6) The information processing apparatus according to any one of (1) to (5), further including
a representation control section that controls the representation of the virtual content on the basis of the reference position.
(7) The information processing apparatus according to (6), in which
the representation control section controls display of a virtual object related to the real object.
(8) The information processing apparatus according to (7), in which
the representation control section controls a display position of the virtual object.
(9) The information processing apparatus according to (8), in which
in response to a movement of a user or a movement of a line of sight of the user being detected, the representation control section changes the display position of the virtual object while the user is moving or while the line of sight of the user is being moved.
(10) The information processing apparatus according to any one of (6) to (9), in which
the representation control section controls output of sound from a virtual sound source related to the real object.
(11) The information processing apparatus according to (1), in which
the representation control section controls a position of the virtual sound source.
(12) The information processing apparatus according to any one of (1) to (11), further including:
a first estimator that estimates the camera-based position on the basis of the captured image; and
a second estimator that estimates the output-wave-based estimation position on the basis of the output wave.
(13) The information processing apparatus according to (12), in which
the first estimator calculates the first reliability on the basis of a result of matching processing on the captured image to check against a model image of the real object.
(14) The information processing apparatus according to (12) or (13), in which
the second estimator
calculates a distance to the real object on the basis of the output wave,
calculates a candidate range in which there possibly exists the real object, on the basis of the calculated distance, and
estimates a position within the calculated candidate range as the output-wave-based estimation position.
(15) The information processing apparatus according to (14), in which
the second estimator calculates the second reliability on the basis of a size of the calculated candidate range.

(16) The information processing apparatus according to any one of (13) to (15), in which
the second estimator
receives information regarding a distance from another apparatus to the real object, the distance being calculated by the other apparatus on the basis of the output wave, and
calculates the candidate range on the basis of the received information regarding the distance from the other apparatus to the real object.
(17) The information processing apparatus according to any one of (1) to (16), in which
the information processing apparatus is configured as a head-mounted display (HMD).
(18) The information processing apparatus according to (13), further including
a model image generator that generates the model image on the basis of the captured image.
(19) An information processing method that is performed by a computer system, the information processing method including:
acquiring a camera-based position indicating a position of a real object, the camera-based position being determined on the basis of a captured image of a real space in which there exists the real object;
acquiring an output-wave-based estimation position indicating the position of the real object, the output-wave-based estimation position being determined on the basis of an output wave that is output to the real space from a position that corresponds to the real object; and
determining a reference position used to represent virtual content related to the real object, on the basis of the camera-based position and the output-wave-based estimation position.
(20) A computer system that causes a computer system to perform a process including:
acquiring a camera-based position indicating a position of a real object, the camera-based position being determined on the basis of a captured image of a real space in which there exists the real object;
acquiring an output-wave-based estimation position indicating the position of the real object, the output-wave-based estimation position being determined on the basis of an output wave that is output to the real space from a position that corresponds to the real object; and
determining a reference position used to represent virtual content related to the real object, on the basis of the camera-based position and the output-wave-based estimation position.

REFERENCE SIGNS LIST

P2 final estimation position
1 user
5 beacon signal
7 virtual object
10 HMD
13 transmissive display
15 outward-oriented camera
20 speaker
42 recognition DB
50 controller
51 self-position estimator
52 real-object distance estimator
53 camera-based position estimator 54 real-object position estimator
55 AR-representation control section
58 reliability determination section
60 server apparatus
61 radio-wave-based position estimator
62 reliability determination section
80 real object
81 BLE beacon output section
90 section for creating environment recognition DB
100 AR providing system

The invention claimed is:

1. An information processing apparatus, comprising:
    circuitry configured to:
        acquire each of a camera-based position indicating a position of a real object and first reliability related to the camera-based position, wherein the camera-based position is based on a captured image of a real space in which the real object exists;
        acquire each of an output-wave-based estimation position indicating the position of the real object and second reliability related to the output-wave-based estimation position, wherein the output-wave-based estimation position is based on an output wave that is output to the real space from a position that corresponds to the real object; and
        determine a reference position used to represent virtual content related to the real object, based on the camera-based position, the output-wave-based estimation position, the first reliability, and the second reliability.

2. The information processing apparatus according to claim 1, wherein the circuitry is further configured to determine a final estimation position of the real object as the reference position.

3. The information processing apparatus according to claim 1, wherein the output wave includes at least one of a radio wave or a sound wave.

4. The information processing apparatus according to claim 1, wherein
    in a case where the first reliability exhibits a value greater than a specified threshold, the circuitry is further configured to determine the camera-based position as the reference position.

5. The information processing apparatus according to claim 1, wherein the circuitry is further configured to control the representation of the virtual content based on the reference position.

6. The information processing apparatus according to claim 5, wherein the circuitry is further configured to control display of a virtual object related to the real object.

7. The information processing apparatus according to claim 6, wherein the circuitry is further configured to control a display position of the virtual object.

8. The information processing apparatus according to claim 7, wherein
    in response to a movement of a user or a movement of a line of sight of the user, the circuitry is further configured to change the display position of the virtual object while the user moves or while the line of sight of the user moves.

9. The information processing apparatus according to claim 5, wherein the circuitry is further configured to control output of sound from a virtual sound source related to the real object.

10. The information processing apparatus according to claim 9, wherein the circuitry is further configured to control a position of the virtual sound source.

11. The information processing apparatus according to claim 1, wherein the circuitry is further configured to:
    estimate the camera-based position based on the captured image; and
    estimate the output-wave-based estimation position based on the output wave.

12. The information processing apparatus according to claim 11, wherein the circuitry is further configured to calculate the first reliability based on a result of a matching operation on the captured image against a model image of the real object.

13. The information processing apparatus according to claim 11, wherein the circuitry is further configured to:
    calculate a distance to the real object based on the output wave;
    calculate a candidate range in which there possibly exists the real object, based on the calculated distance; and
    estimate a position within the calculated candidate range as the output-wave-based estimation position.

14. The information processing apparatus according to claim 13, wherein the circuitry is further configured to calculate the second reliability based on a size of the candidate range.

15. The information processing apparatus according to claim 11, wherein the circuitry is further configured to:
    receive information regarding a distance from a different apparatus to the real object, wherein the distance is calculated by the different apparatus based on the output wave;
    calculate a candidate range in which there possibly exists the real object, based on the received information regarding the distance from the different apparatus to the real object; and
    estimate a position within the calculated candidate range as the output-wave-based estimation position.

16. The information processing apparatus according to claim 1, wherein the information processing apparatus is configured as a head-mounted display (HMD).

17. The information processing apparatus according to claim 12, wherein the circuitry is further configured to generate the model image based on the captured image.

18. An information processing method, comprising:
    acquiring each of a camera-based position indicating a position of a real object and first reliability related to the camera-based position, wherein the camera-based position is based on a captured image of a real space in which the real object exists;
    acquiring each of an output-wave-based estimation position indicating the position of the real object and second reliability related to the output-wave-based estimation position, wherein the output-wave-based estimation position is based on an output wave that is output to the real space from a position that corresponds to the real object; and
    determining a reference position used to represent virtual content related to the real object, based on the camera-based position, the output-wave-based estimation position, the first reliability, and the second reliability.

19. A non-transitory computer-readable medium having stored thereon, computer-executable instructions which, when executed by a computer, cause the computer to execute operations, the operations comprising:
    acquiring each of a camera-based position indicating a position of a real object and first reliability related to the camera-based position, wherein the camera-based position is based on a captured image of a real space in which the real object exists;

acquiring each of an output-wave-based estimation position indicating the position of the real object and second reliability related to the output-wave-based estimation position, wherein the output-wave-based estimation position is based on an output wave that is output to the real space from a position that corresponds to the real object; and determining a reference position used to represent virtual content related to the real object, based on the camera-based position, the output-wave-based estimation position, the first reliability, and the second reliability.

* * * * *